(12) United States Patent
Klinkman et al.

(10) Patent No.: US 10,907,383 B2
(45) Date of Patent: Feb. 2, 2021

(54) DOCK FOR A PORTABLE ELECTRONIC DEVICE

(71) Applicant: ACCO Brands Corporation, Lake Zurich, IL (US)

(72) Inventors: Alex J. Klinkman, Oakland, CA (US); Mike Otsuka, Sunnyvale, CA (US); Wilson Tse, Burnaby (CA); Joseph A. Teresi, San Mateo, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 15/909,549

(22) Filed: Mar. 1, 2018

(65) Prior Publication Data

US 2018/0252003 A1    Sep. 6, 2018

Related U.S. Application Data

(60) Provisional application No. 62/465,607, filed on Mar. 1, 2017.

(51) Int. Cl.
*E05B 73/00* (2006.01)
*G06F 1/16* (2006.01)

(52) U.S. Cl.
CPC ........ *E05B 73/0082* (2013.01); *G06F 1/1632* (2013.01); *E05B 73/0005* (2013.01)

(58) Field of Classification Search
CPC .. E05B 73/0082; E05B 73/0005; E05B 73/00; G06F 1/1632; H04M 1/04; F16M 13/00; H04B 1/3877
See application file for complete search history.

(56) References Cited

U.S. PATENT DOCUMENTS

| 4,066,231 A | 1/1978 | Bahner et al. |
| 4,453,692 A | 6/1984 | LeDoux et al. |
| 4,918,954 A | 4/1990 | Stickel et al. |

(Continued)

FOREIGN PATENT DOCUMENTS

| CA | 2291365 A | 5/2001 |
| GB | 2286630 A | 8/1995 |
| GB | 2300879 A | 11/1996 |
| JP | H07334265 A | 12/1995 |
| JP | H10143279 A | 5/1998 |

(Continued)

OTHER PUBLICATIONS

International Search Report and Written Opinion for Application No. PCT/US2018/020479 dated Jun. 14, 2018 (10 pages).

(Continued)

*Primary Examiner* — James Wu
(74) *Attorney, Agent, or Firm* — Michael Best & Friedrich LLP

(57) ABSTRACT

A dock for a portable electronic device includes a base and a first arm supported by the base. The first arm includes a first hook coupled to an end of the first arm. The first hook is configured to engage a first edge of the portable electronic device. The dock further includes a second arm supported by the base. The second arm includes a side door movably coupled to an end of the second arm. The side door has a second hook configured to engage a second edge of the portable electronic device. The side door is movable between a first position, in which the portable electronic device is secured to the dock, and a second position, in which the portable electronic device is removable from the dock.

18 Claims, 22 Drawing Sheets

(56) References Cited

U.S. PATENT DOCUMENTS

| | | |
|---|---|---|
| 5,052,199 A | 10/1991 | Derman |
| 5,076,079 A | 12/1991 | Monoson et al. |
| 5,162,976 A | 11/1992 | Moore et al. |
| 5,347,425 A | 9/1994 | Herron et al. |
| 5,351,508 A | 10/1994 | Kelley |
| 5,457,745 A | 10/1995 | Wang |
| 5,477,415 A | 12/1995 | Mitcham et al. |
| 5,553,824 A | 9/1996 | Dutra, Jr. |
| 5,582,044 A | 12/1996 | Bolich |
| D383,739 S | 9/1997 | Gilgen |
| 5,708,561 A | 1/1998 | Huilgol et al. |
| 5,751,548 A | 5/1998 | Hall et al. |
| 5,790,375 A | 8/1998 | Lee |
| 5,816,076 A | 10/1998 | Biedermann et al. |
| 5,818,691 A | 10/1998 | McMahan et al. |
| 5,870,283 A | 2/1999 | Maeda et al. |
| D410,447 S | 6/1999 | Chang |
| 5,921,697 A | 7/1999 | Karl et al. |
| 5,946,186 A | 8/1999 | Karl et al. |
| 5,948,074 A | 9/1999 | Ninomiya |
| 6,002,921 A | 12/1999 | Pfahlert et al. |
| 6,006,557 A | 12/1999 | Carl et al. |
| 6,034,869 A | 3/2000 | Lin |
| 6,072,695 A | 6/2000 | Steiger et al. |
| 6,115,247 A | 9/2000 | Helot |
| 6,125,669 A | 10/2000 | McDaid et al. |
| 6,138,483 A | 10/2000 | Galant |
| 6,185,095 B1 | 2/2001 | Helot et al. |
| 6,212,921 B1 | 4/2001 | Knighton |
| 6,216,499 B1 | 4/2001 | Ronberg et al. |
| 6,220,883 B1 | 4/2001 | Helot et al. |
| 6,298,695 B1 | 10/2001 | Vezina et al. |
| 6,308,928 B1 | 10/2001 | Galant |
| 6,331,934 B1 | 12/2001 | Helot et al. |
| 6,393,879 B1 | 5/2002 | William |
| 6,426,872 B1 | 7/2002 | Sutton et al. |
| 6,443,417 B2 | 9/2002 | Galant |
| 6,484,544 B1 | 11/2002 | Wing |
| 6,490,154 B2 | 12/2002 | Thompson |
| 6,560,710 B1 | 5/2003 | Leyden et al. |
| 6,581,420 B1 | 6/2003 | Ling et al. |
| 6,595,423 B2 | 7/2003 | Cho et al. |
| 6,615,993 B1 | 9/2003 | Rudiger |
| 6,711,921 B1 | 3/2004 | Yang |
| 6,744,627 B2 | 6/2004 | Won et al. |
| 6,763,690 B2 | 7/2004 | Galant |
| 6,796,536 B1 | 9/2004 | Sevier, IV |
| 6,848,662 B2 * | 2/2005 | Paramonoff ............ E05C 3/14 248/222.11 |
| 6,856,506 B2 | 2/2005 | Doherty et al. |
| 6,883,694 B2 | 4/2005 | Abelow |
| 6,913,238 B2 | 7/2005 | Bakker et al. |
| 6,967,836 B2 | 11/2005 | Huang et al. |
| 7,007,912 B1 | 3/2006 | Giuliani et al. |
| 7,032,872 B2 | 4/2006 | Sullivan |
| 7,174,752 B2 | 2/2007 | Galant |
| 7,227,747 B2 | 6/2007 | Walker et al. |
| 7,315,443 B2 | 1/2008 | Allen |
| 7,324,333 B2 | 1/2008 | Allen |
| 7,443,665 B2 | 10/2008 | Allen |
| D587,712 S | 3/2009 | Park et al. |
| 7,506,592 B2 | 3/2009 | Rossini |
| D589,964 S | 4/2009 | Kleggland et al. |
| 7,566,033 B2 | 7/2009 | Schwager et al. |
| D599,801 S | 9/2009 | Skaf et al. |
| D602,938 S | 10/2009 | Ward et al. |
| 7,614,264 B2 | 11/2009 | McGettrick |
| 7,679,902 B2 | 3/2010 | Thompson |
| 7,724,520 B2 | 5/2010 | Allen |
| 7,787,242 B2 | 8/2010 | Schwager et al. |
| 7,817,415 B2 | 10/2010 | Chuang |
| D642,123 S | 7/2011 | Joung |
| 8,061,164 B2 | 11/2011 | Johnston et al. |
| 8,139,356 B2 | 3/2012 | Allen |
| 8,171,762 B2 | 5/2012 | Hsiao et al. |
| 8,185,681 B2 | 5/2012 | Downing et al. |
| 8,223,488 B2 | 7/2012 | Peter |
| D673,567 S | 1/2013 | Yang |
| 8,369,082 B2 | 2/2013 | Madonna et al. |
| 8,405,974 B2 | 3/2013 | Sayavong |
| 8,418,514 B1 | 4/2013 | Su |
| D685,797 S | 7/2013 | Fahrendorff et al. |
| 8,508,932 B2 | 8/2013 | Duval |
| 8,602,224 B2 | 12/2013 | Casey |
| 8,608,119 B2 | 12/2013 | Wolff et al. |
| 8,717,758 B2 | 5/2014 | Allen |
| 8,749,963 B2 | 6/2014 | Staats et al. |
| 8,814,128 B2 | 8/2014 | Trinh et al. |
| 8,837,144 B1 | 9/2014 | Allen |
| 8,842,011 B2 | 9/2014 | Casey |
| 8,851,565 B2 | 10/2014 | Hontz et al. |
| 8,867,202 B2 | 10/2014 | Williams |
| 8,882,069 B2 | 11/2014 | Mahaffey |
| 9,030,828 B2 | 5/2015 | Lindblad et al. |
| 9,032,766 B2 | 5/2015 | Su |
| D731,490 S | 6/2015 | Kim et al. |
| 9,105,166 B1 | 8/2015 | Kelsch et al. |
| 9,128,671 B2 | 9/2015 | Lee |
| 9,163,433 B2 | 10/2015 | Sedon |
| D742,383 S | 11/2015 | Zheng et al. |
| D742,886 S | 11/2015 | Zheng et al. |
| 9,194,532 B2 | 11/2015 | Bisesti et al. |
| 9,206,626 B2 | 12/2015 | Allen |
| 9,220,358 B2 | 12/2015 | Wheeler et al. |
| D750,631 S | 3/2016 | Kim et al. |
| 9,274,556 B2 | 3/2016 | Gallouzi et al. |
| 9,291,299 B2 | 3/2016 | Richard et al. |
| 9,304,548 B2 | 4/2016 | Chen et al. |
| 9,410,344 B2 | 8/2016 | Stacey et al. |
| D771,052 S | 11/2016 | Zheng et al. |
| 9,562,375 B2 | 2/2017 | Allen |
| 9,568,141 B1 * | 2/2017 | Zaloom ................ F16M 11/12 |
| 9,581,286 B2 | 2/2017 | Hansen |
| 9,663,977 B2 | 5/2017 | Vroom |
| D792,414 S | 7/2017 | Floersch et al. |
| 9,727,092 B1 | 8/2017 | Gerbus et al. |
| D803,827 S | 11/2017 | Escolin et al. |
| 9,811,118 B2 | 11/2017 | Vroom et al. |
| 9,820,404 B1 | 11/2017 | Wu et al. |
| 9,898,041 B2 | 2/2018 | Blowers et al. |
| 10,125,523 B2 | 11/2018 | Allen |
| 10,222,835 B2 * | 3/2019 | Lim ................... H04M 1/0214 |
| 10,443,274 B2 | 10/2019 | Allen |
| 10,485,312 B2 | 11/2019 | Rodriguez |
| 10,704,299 B2 | 7/2020 | Allen |
| 2003/0235029 A1 | 12/2003 | Doherty et al. |
| 2004/0007651 A1 | 1/2004 | Williams et al. |
| 2004/0040350 A1 | 3/2004 | Derman |
| 2004/0065126 A1 | 4/2004 | Yang |
| 2004/0177658 A1 | 9/2004 | Mitchell |
| 2004/0233631 A1 | 11/2004 | Lord |
| 2005/0039502 A1 | 2/2005 | Avganim |
| 2005/0077448 A1 | 4/2005 | Rossini |
| 2006/0066438 A1 | 3/2006 | Altounian |
| 2006/0256512 A1 | 11/2006 | Esther Kang |
| 2010/0007613 A1 | 1/2010 | Costa |
| 2010/0079285 A1 | 4/2010 | Fawcett et al. |
| 2010/0147041 A1 | 6/2010 | Teicher et al. |
| 2010/0195294 A1 | 8/2010 | Sakata et al. |
| 2011/0143583 A1 | 6/2011 | Zilmer et al. |
| 2011/0179834 A1 | 7/2011 | Mahaffey et al. |
| 2011/0185776 A1 * | 8/2011 | Mahaffey ............ E05B 73/0005 70/58 |
| 2012/0026684 A1 | 2/2012 | Matthews |
| 2012/0103863 A1 | 5/2012 | Perez et al. |
| 2012/0127651 A1 | 5/2012 | Kwon et al. |
| 2012/0170194 A1 | 7/2012 | Lord et al. |
| 2012/0175474 A1 | 7/2012 | Barnard et al. |
| 2012/0188689 A1 | 7/2012 | Leung |
| 2012/0307448 A1 | 12/2012 | Allen |
| 2013/0026322 A1 | 1/2013 | Wheeler et al. |
| 2013/0107126 A1 | 5/2013 | Nonomura et al. |
| 2013/0277520 A1 | 10/2013 | Funk et al. |
| 2013/0301216 A1 | 11/2013 | Trinh et al. |

(56) References Cited

U.S. PATENT DOCUMENTS

| | | |
|---|---|---|
| 2014/0118930 A1 | 5/2014 | Sedon |
| 2014/0168884 A1 | 6/2014 | Wylie |
| 2015/0002998 A1 | 1/2015 | Arima et al. |
| 2015/0072555 A1 | 3/2015 | Riddiford et al. |
| 2015/0076188 A1 | 3/2015 | Venida et al. |
| 2015/0083885 A1 | 3/2015 | Mahaffey et al. |
| 2015/0192929 A1 | 7/2015 | Rihn et al. |
| 2015/0220113 A1 | 8/2015 | Zhao et al. |
| 2015/0279535 A1 | 10/2015 | Arlington et al. |
| 2015/0292669 A1 | 10/2015 | Floersch et al. |
| 2016/0020805 A1 | 1/2016 | Fan |
| 2016/0161045 A1 | 6/2016 | Lee et al. |
| 2016/0299540 A1 | 10/2016 | Kim et al. |
| 2016/0372856 A1 | 12/2016 | MeMeulenaere et al. |
| 2017/0051538 A1 | 2/2017 | Kobayashi et al. |
| 2017/0247916 A1 | 8/2017 | Kao et al. |
| 2017/0300082 A1 | 10/2017 | Park et al. |
| 2018/0031174 A1 | 2/2018 | Sanders |
| 2019/0078355 A1 | 3/2019 | Allen |
| 2019/0196534 A1 | 6/2019 | Tseng et al. |
| 2019/0234553 A1 | 8/2019 | Hallar et al. |

FOREIGN PATENT DOCUMENTS

| | | |
|---|---|---|
| JP | H10198459 A | 7/1998 |
| JP | H11272363 A | 10/1999 |
| JP | 2000333799 A | 12/2000 |
| JP | 2001344036 A | 12/2001 |
| JP | 2003000405 A | 1/2003 |
| JP | 2003044173 A | 2/2003 |
| JP | 3101784 U | 6/2004 |
| KR | 1998-0018730 U | 7/1998 |
| KR | 2004-0005519 A | 1/2004 |
| KR | 2004-0108174 A | 12/2004 |
| WO | 2002035037 A1 | 5/2002 |
| WO | 2018048436 A1 | 3/2018 |

OTHER PUBLICATIONS

Think Products Inc., "First Amended Complaint for Patent Infringement", United States District Court for the Nothern District of Illinois Eastern Division, Nov. 14, 2019 (14 pages).

European Patent Office Extended Search Report for Application No. 18760405.3 dated Feb. 11, 2020 (8 pages).

\* cited by examiner

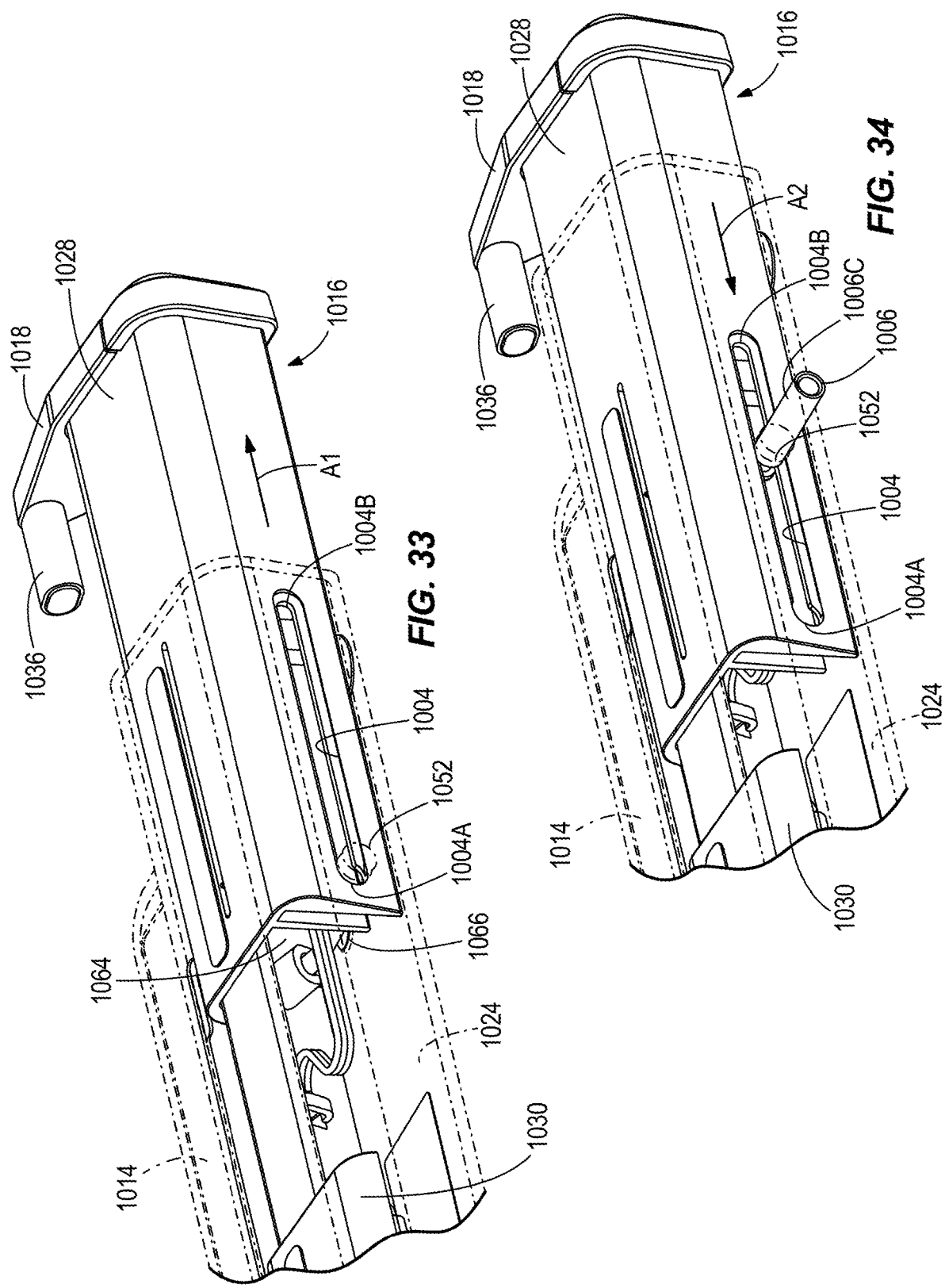

DOCK FOR A PORTABLE ELECTRONIC DEVICE

CROSS-REFERENCE TO RELATED APPLICATIONS

This application claims priority to U.S. Provisional Patent Application No. 62/465,607, filed Mar. 1, 2017, the entire contents of which are incorporated by reference herein.

FIELD OF THE INVENTION

The present invention relates to a dock for a portable electronic device and, more particularly, to a dock for securing a notebook or laptop computer.

SUMMARY

In one embodiment, the invention provides a dock for a portable electronic device. The dock includes a base and a first arm supported by the base. The first arm includes a first hook coupled to an end of the first arm. The first hook is configured to engage a first edge of the portable electronic device. The dock further includes a second arm supported by the base. The second arm includes a side door movably coupled to an end of the second arm. The side door has a second hook configured to engage a second edge of the portable electronic device. The side door is movable between a first position, in which the portable electronic device is secured to the dock, and a second position, in which the portable electronic device is removable from the dock.

In another embodiment, the invention provides a dock for a portable electronic device. The dock includes a base having a channel and a first arm slidably received in a first side of the channel. The first arm includes a first hook coupled to an end of the first arm. The first hook is configured to engage a first edge of the portable electronic device. The dock further includes a second arm slidably received in a second side of the channel. The second arm includes a side door movably coupled to an end of the second arm. The side door has a second hook configured to engage a second edge of the portable electronic device. The dock further includes a lock mechanism coupled to the second arm, the lock mechanism operable to selectively secure the side door to the end of the second arm.

Other aspects of the invention will become apparent by consideration of the detailed description and accompanying drawings.

BRIEF DESCRIPTION OF THE DRAWINGS

FIG. 33 is a rear perspective view of the dock shown in FIG. 30, with an arm in in an extended position.

FIG. 34 is a rear perspective view of the dock shown in FIG. 30, with the arm in a retracted position.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
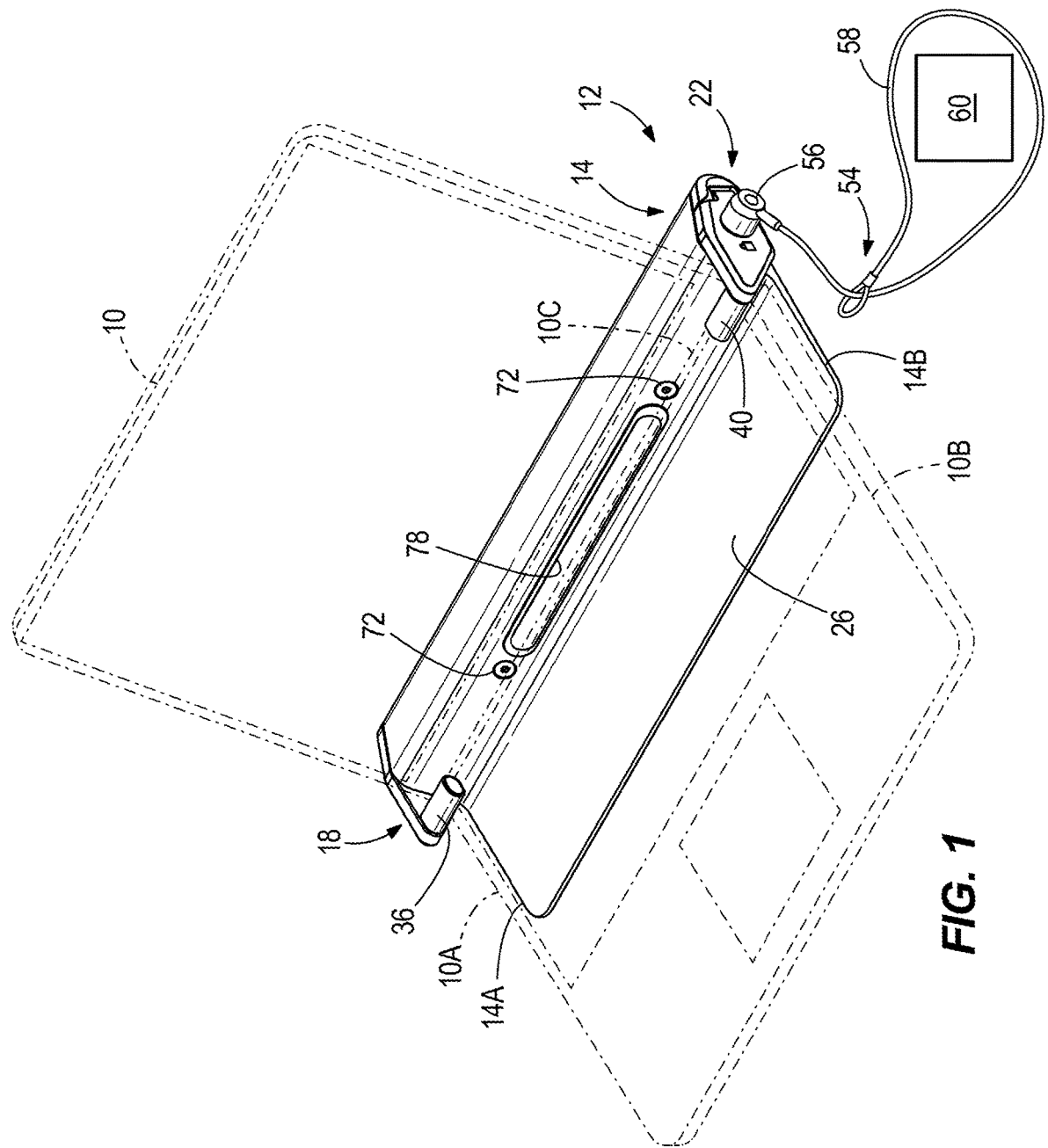
FIG. 1 is a perspective view of a system including a portable electronic device and a dock securing the portable electronic device.

FIG. 1 illustrates a system including a portable electronic device 10 and a dock 12. The electronic device 10 is secured to the dock 12. In the illustrated embodiment, the portable electronic device 10 is a portable computer such as a laptop or notebook computer. In other embodiments, the portable electronic device 10 may be another electronic device having a hinge. As shown in FIGS. 2-5, the dock 12 includes a base 14, a first arm 16 with a first hook 18, and a second arm 20 with a second hook 22.

Figure 5:
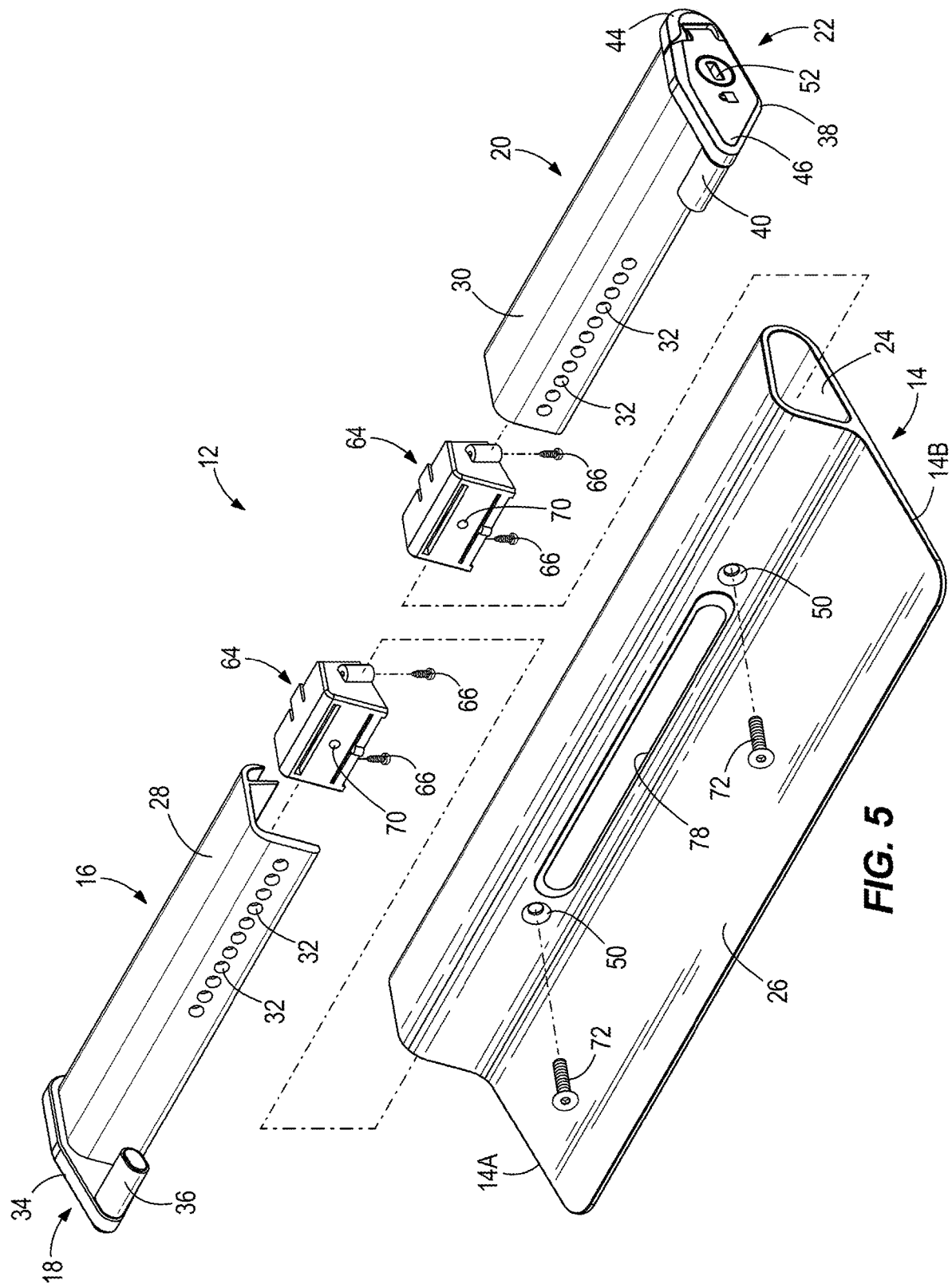
FIG. 5 is an exploded perspective view of the dock shown in FIG. 1.

Referring to FIG. 5, the base 14 includes a channel 24 of a constant cross-section extending between a first side 14A of the base 14 and a second side 14B of the base 14. The channel 24, as shown, has an irregular polygon or non-circular cross-section such that the arms 16, 20 are not capable of rotation relative to the channel 24. The channel 24 further includes a plurality of apertures 50 extending from an external surface of the channel 24 that backs against a portion of the electronic device 10 to an internal surface of the channel 24. In the illustrated embodiment, the base 14 includes two apertures 50 positioned on either side of a pad 78. The pad 78 may be, for example, an elastomeric member that contacts a back surface of the portable electronic device 10 (FIG. 1) to inhibit the device 10 from scraping against the base 14. Each aperture 50 corresponds to one of the arms 16, 20 and receives a fastener 72 (e.g., a screw) to secure the position of the arm 16, 20 relative to the base 14.

The base 14 further includes a support platform 26 extending from the channel 24. The support platform 26 is a rigid, flat surface and is configured to be positioned under at least part of the portable electronic device 10. As shown in FIG. 1, the support platform 26 is located below the keyboard of the electronic device 10.

With continued reference to FIG. 5, each arm 16, 20 includes a body portion 28, 30 having an outer cross-section similar to at least some of the inner cross-section of the channel 24. This allows the body portions 28, 30 of the respective arms 16, 20 to slide into and mate with the channel 24 from opposing sides 14A, 14B of the base 14. Each body portion 28, 30 includes a plurality of apertures 32 linearly aligned along a lengthwise direction of the respective body portion 28, 30. The apertures 32 receive the fasteners 72 extending through the base 14.

The first arm 16 is capped by the first hook 18 at a distal end of the arm 16 (i.e., the end located outside of the channel 24 when assembled as shown in FIG. 1). The first hook 18 includes a plate 34 extending from and attached to the first arm 16 and a protrusion 36 extending from the plate 34 parallel to the lengthwise direction of the first arm 16. The first hook 18 is a fixed hook as the hook 18 is fixed (i.e., stationary) relative to the first arm 16. In the illustrated embodiment, the first hook 18 is permanently attached to the first arm 16, and the plate 34 of the first hook 18 is permanently attached to the protrusion 36. For example, the arm 16, the plate 34, and the protrusion 36 may be integrally formed, molded, welded, glued, bolted, or otherwise secured together.

Figure 3:
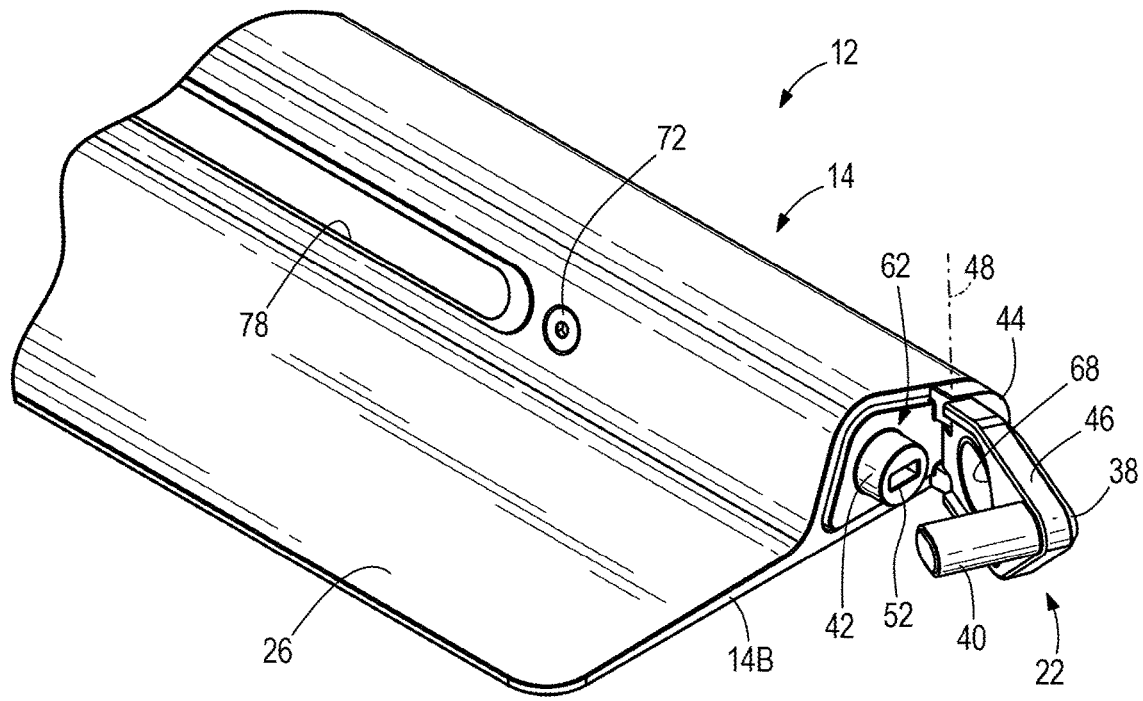
FIG. 3 is a perspective view of a portion of the dock shown in FIG. 1 with the side door in an open position.

The second hook 22 is similar to the first hook 18 except as otherwise specified. The second hook 22 mirrors the first hook 18 such that the hook 22 is fixed to a distal end of the second arm 20 (i.e., the end located outside of the channel 24 when assembled as shown in FIG. 1). As shown in FIG. 3, the plate 38 is constructed of two components: a cover 62 and a side door 46. The cover 62 includes a lock mount 42 and a jamb 44. The cover 62 is attached to an end of the second arm 20 to cap the second arm 20. The illustrated lock mount 42 is a cylindrical boss extending outward from the second arm 20 and includes a slot 52.

Figure 2:
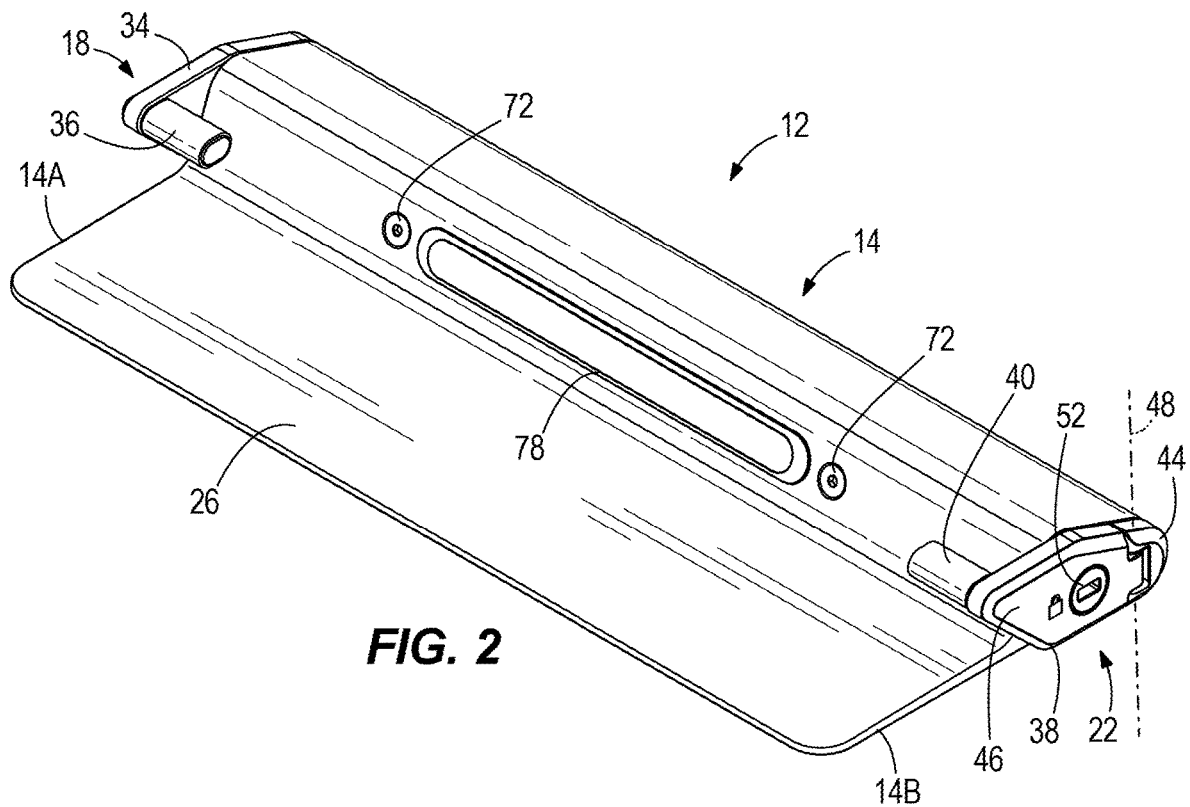
FIG. 2 is a perspective view of the dock shown in FIG. 1, the dock including two arms in a retracted position and a side door in a closed position.

The side door 46 is attached to the jamb 44 and is movable relative to the jamb 44 about a rotational axis 48 (FIGS. 2-3) between a first position and a second position. In the first position, as shown in FIG. 2, the side door 46 is positioned around the lock mount 42 such that an opening 68 in the side door 46 surrounds the lock mount 42. The first position of the second hook 22 mirrors the position of the first hook 18, where the protrusion 40 extends parallel to the lengthwise direction of the second arm 20. In the second position, as shown in FIG. 3, the side door 46 is rotated relative to the jamb 44 and moved away from the lock mount 42 such that the protrusion 40 is no longer parallel to the lengthwise direction of the second arm 20. In other words, in the first position (FIG. 2) the side door 46 is closed, and in the second position (FIG. 3) the side door 46 is open.

The cover 62 is lockable to the side door 46 in the first position via a lock 54, such as a laptop lock. Referring back to FIG. 1, the lock 54 includes a locking head 56 and a flexible cable 58 attached thereto. The flexible cable 58 is wrapped around an immovable object 60 (e.g., a desk, a chair, a wall strut, a bracket, etc.) such that substantial transportation of the portable electronic device 10 first requires removal of the lock 54 from the slot 52. When the lock 54 is inserted into the slot 52 in the cover 62 and locked, the locking head 56 physically blocks the side door 46 from rotating relative to the jamb 44 from the first position to the second position. The locking head 56 of the lock 54 may be rotated within the slot 52 (e.g., with a key) to fasten the lock 54 to the dock 12 and inhibit removal of the locking head 56 from the dock 12. Alternatively, a component within the dock 12 may grasp the locking head 56 when inserted into the slot 52. In some embodiments, the locking head 56 may be used without the cable 58 to block movement of the side door 46. In such embodiments, the cable 58 may be a separate component that is attached to a different part of the dock 12, or the dock 12 may be secured to an immovable object using other suitable means. Collectively, the lock mount 42 and the lock 54 form a lock mechanism. In other embodiments, other suitable lock mechanisms may be used to selectively inhibit movement of the side door 46 relative to the jamb 44.

As shown in FIG. 5, the dock 12 includes two guide blocks 64, or one guide block 64 per arm 16, 20. The guide blocks 64 are fastened to an internal surface of the channel 24 with fasteners 66 (e.g., screws). The fasteners 66 do not engage the first or second arms 16, 20. Each guide block 64 is located within the channel 24 so a threaded aperture 70 of the guide block 64 is aligned with one of the apertures 50 (FIG. 5) in the channel 24. The guide blocks 64 also help support the arms 16, 20 for movement relative to the channel 24. When each guide blocks 64 is fastened to the channel 24, a gap remains between portions of the guide block 64 and the channel 24. The gaps are sized to permit clearance of the arms 16, 20 to slidably translate relative to the channel 24.

Figure 4:
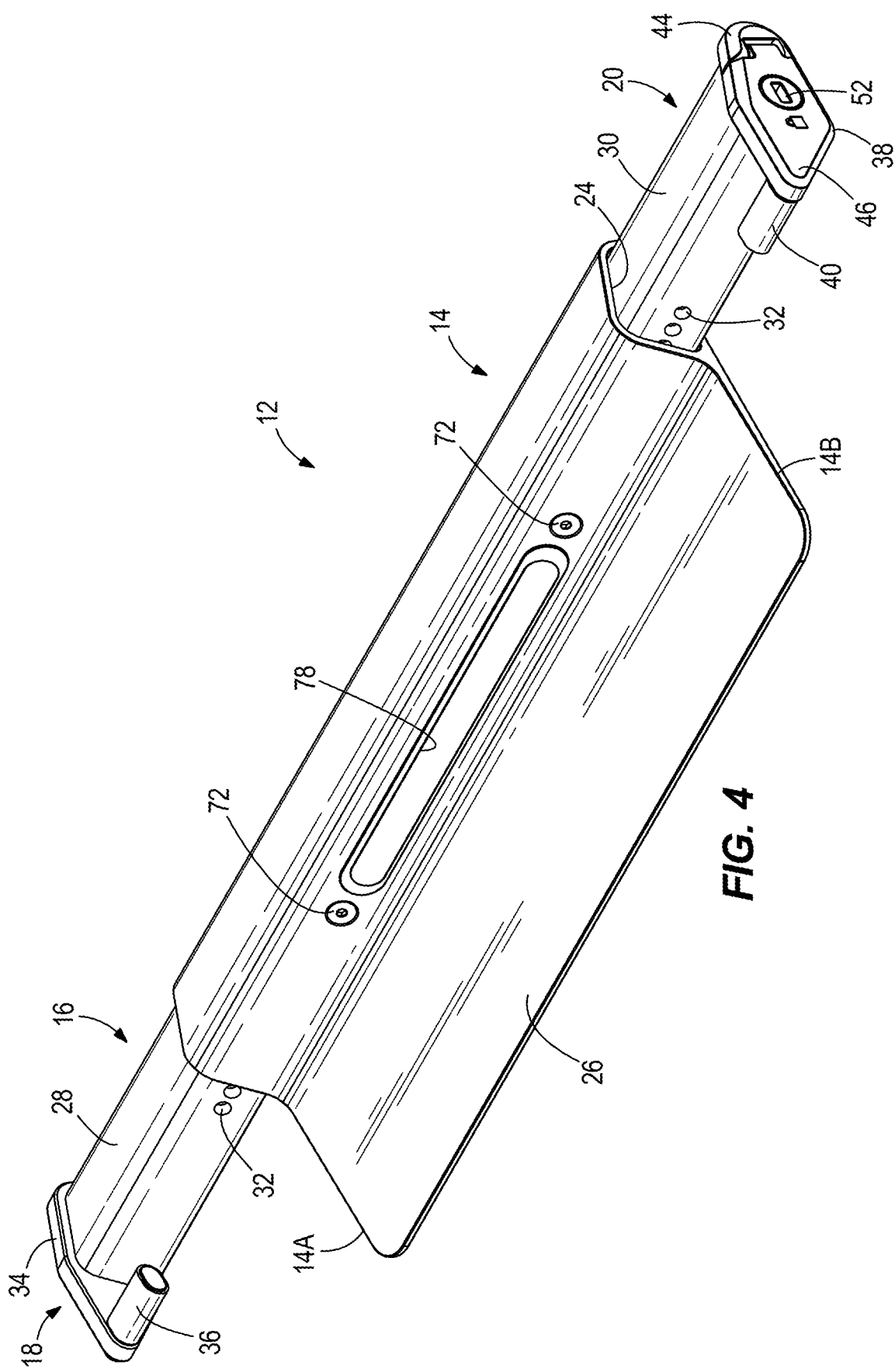
FIG. 4 is a perspective view of the dock shown in FIG. 1 with the two arms in an extended position.

The arms 16, 20 are individually capable of translating between retracted positions (as shown in FIG. 2), in which a majority of the respective arm 16, 20 is located within the channel 24, and extended positions (one of which is shown in FIG. 4), in which a portion of the respective arm 16, 20 extends out from the channel 24. The arms 16, 20 are secured in various stages of extension via the fasteners 72 and apertures 32. Therefore, the dock 12 is capable of securing electronic devices 10 of various sizes between the opposing hooks 18, 22.

In operation, the dock 12 is first arranged to support the overall width of the portable electronic device 10 (e.g., between a first edge 10A and a second edge 10B of the portable electronic device 10). With the guide blocks 64 held stationary relative to the channel 24 of the base 14 via the fasteners 66, the arms 16, 20 are slidable (e.g., capable of translation) within the gap defined between the guide blocks 64 and channel 24. After generally assessing the width of the portable electronic device 10 (from edge 10A to edge 10B), the arms 16, 20 are slidably adjusted within the channel such that the width of the portable electronic device 10 is greater than the distance between the protrusions 36, 40, but is less than the distance between the plates 34, 38. The arms 16, 20 are further translated (while remaining within the range specified above) such that one of the apertures 32 in the each of the arms 16, 20 is axially aligned with respective aperture 50 in the channel 24 and the threaded aperture 70 in the respective guide block 64. The fasteners 72 are inserted through the respective apertures 32, 50 and are threaded into the apertures 70, thereby locking the arms 16, 20 to inhibit further translation of the arms 16, 20 relative to the base 14 or the portable electronic device 10. When the portable electronic device 10 is located on the dock 12, as described below, the device 10 obstructs access to the fasteners 72, thereby inhibiting translation or removal of the arms 16, 20 from the channel 24 when the portable electronic device 10 is locked to the dock 12.

To lock the portable electronic device 10 to the dock 12, the side door 46 is moved to the open position, as shown in FIG. 3. This allows the first edge 10A of the portable electronic device 10 to slide between the base 14 and the first protrusion 36. The side door 46 is then rotated about the rotational axis 48 to the closed position, as shown in FIG. 2, thereby rotating the second protrusion 40 about the second edge 10B of the portable electronic device 10. The second edge 10B of the portable electronic device 10 is located between the base 14 and the second protrusion 40. The locking head 56 of the laptop lock 54 (FIG. 1) is then inserted into the slot 52 and placed in a locked state to lock the side door 46 to the body portion 30 in the first position.

As shown in FIG. 1, the portable electronic device 10 may be a laptop computer, and the portion of the laptop computer that is provided between the base 14 and the protrusions 36, 40 is at or adjacent the hinge 10C of the laptop computer. Locating the protrusions 36, 40 at or adjacent the hinge 10C (in combination with the size and rigidity of the support platform 26) inhibits a person from removing the laptop computer from the dock 12 by sliding either the screen or keyboard of the laptop computer under and past the protrusions 36, 40.

To remove the portable electronic device 10 from the dock 12, the laptop lock 54 is first unlocked and removed from the slot 52. The side door 46 is then rotated about the rotational axis 48 from the closed position (FIG. 2) to the open position (FIG. 3), thereby rotating the second protrusion 40 relative to the portable electronic device 10. The portable electronic device 10 is then slidable from between the first protrusion 36 and the channel 24 to conclude removal of the device 10 from the dock 12.

Figure 6:
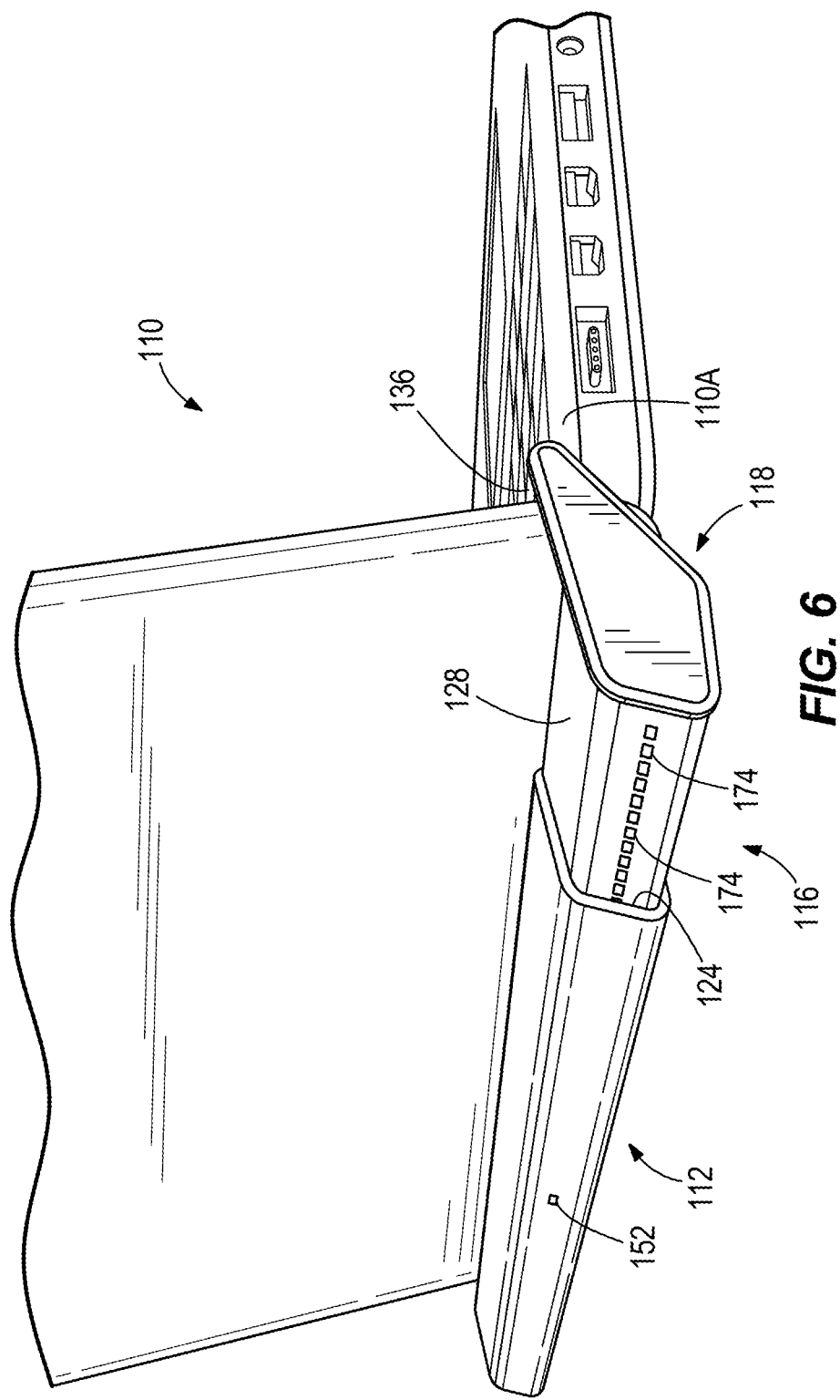
FIG. 6 is a rear perspective view of another dock securing a portable electronic device.

FIG. 6 illustrates another embodiment of a dock 112. The illustrated dock 112 is similar to the dock 12 discussed above, except as otherwise described. Like elements are numbered with like reference numerals, incremented by 100.

The dock 112 secures a portable electronic device 110 to selectively inhibit removal of the device 110 from the dock 112. The dock 112 includes a channel 124 and a single translatable arm 116 having a hook 118 and a body portion 128 slidable within the channel 124. While the dock 112 does not include a translatable second arm, a fixed second arm having a second hook (not shown) can be positioned at the opposite end of the channel 124. The second arm and hook may be integrally formed or permanently attached (e.g., heat staked, friction welded, etc.) to the channel 124.

In the illustrated embodiment, the arm 116 includes a plurality of apertures 174 extending axially along the rear of the body portion 128. Each aperture 174 is a generally rectangular slot (e.g., a K-slot) and is associated with different extended positions of the arm 116. Further, the rear of the channel 124 includes a single slot 152 (e.g., a K-slot) that is selectively aligned with any of the plurality of slots 174 as the arm 116 is translated relative to the channel 124.

In operation, to lock the portable electronic device 110 to the dock 112, the arm 116 is extended to a width that permits a user to slide an edge of the device 110 behind the second hook. The arm 116 is then translated within the channel 124 until the protrusion 136 extends around an opposite edge 110A of the device 110. A locking head of a laptop lock (similar to the laptop lock 54 shown in FIG. 1) is inserted into the slot 152 in the channel 124 and into the aligned one of the plurality of slots 174 in the arm 116. The locking head is placed into a locked state, thereby prohibiting translation of the arm 116 relative to the channel 124 and prohibiting removal of the portable electronic device 110 from the dock 112.

To remove the portable electronic device 110 from the dock 112, the laptop lock is unlocked and removed from the aligned slots 174, 152. The arm 116 is translated to move the protrusion 136 away from the device 110. The portable electronic device 110 is then slidable from between the second protrusion and the channel 124 to conclude removal of the device 110 from the dock 112.

Figure 7:
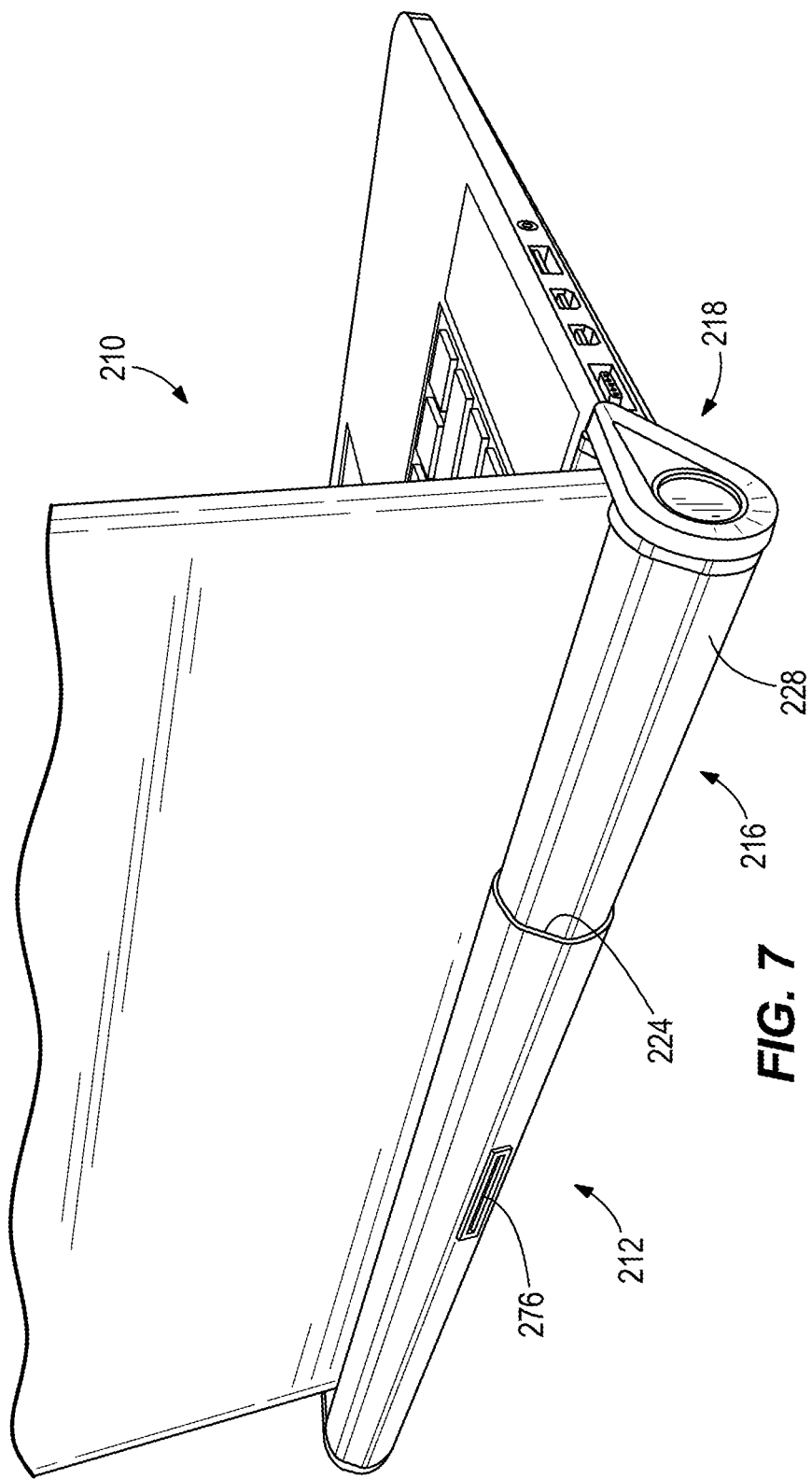
FIG. 7 is a rear perspective view of yet another dock securing a portable electronic device.
Figure 8:
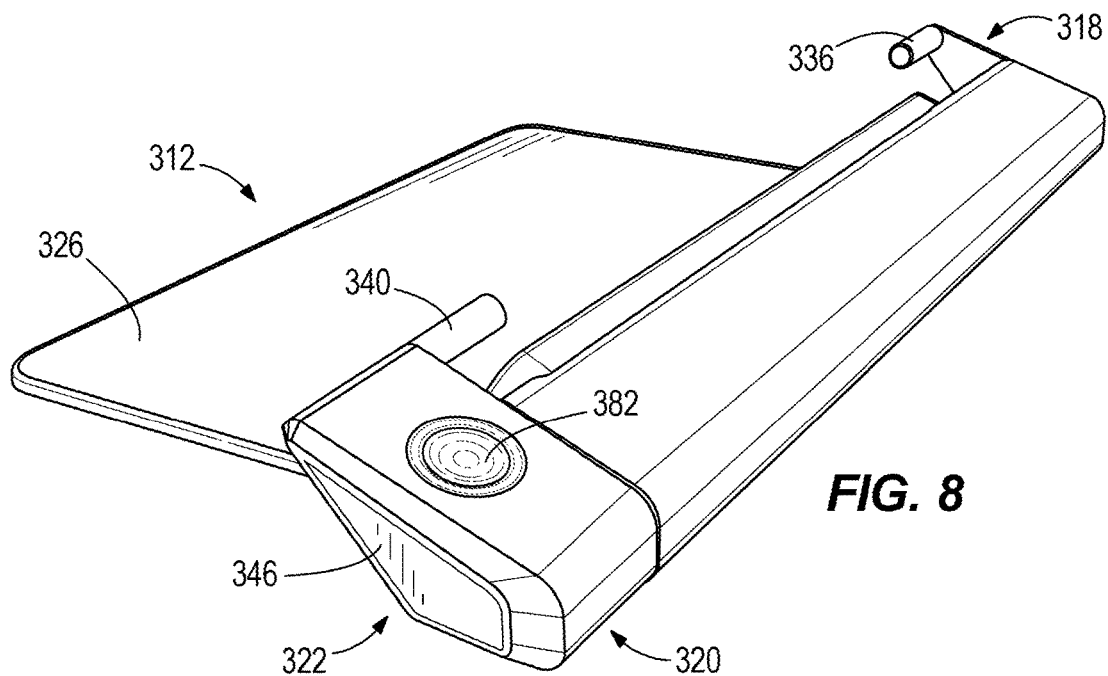
FIG. 8 is a perspective view of another dock, the dock including an electronic lock mechanism.
Figure 9:
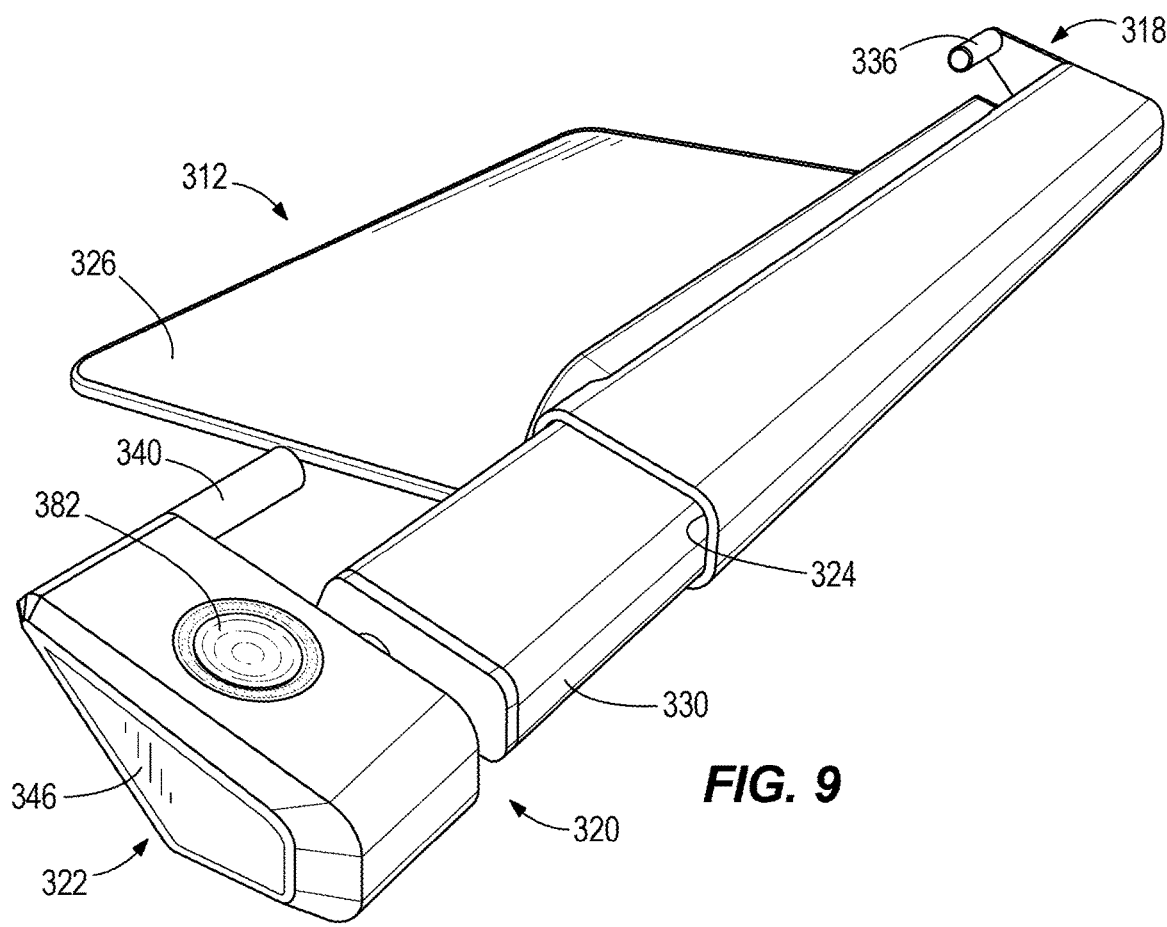
FIG. 9 is a perspective view of the dock shown in FIG. 8 with the electronic lock mechanism exploded away from the dock.

FIG. 7 illustrates another embodiment of a dock 212. The illustrated dock 212 is similar to the docks 12 and 112 discussed above, except as otherwise described. Like elements are numbered with like reference numerals, incremented by 200.

The dock 212 secures a portable electronic device 210 to selectively inhibit removal of the device 210 from the dock 212. The dock 212 includes a channel 224 and one or more translatable arms 216, each having a hook 218 and a body portion 228 that is slidable within the channel 224. As shown, the channel 224 includes a rearward facing slot 276 (i.e., facing away from the portable electronic device 210 when supported by the dock 212). The slot 276 functions in combination with a forward facing slot to provide an access path for cables (e.g., power cables, USB cables, Ethernet cables, VGA, DVI, HDMI, DisplayPort cables, etc.) to extend from the portable electronic device 210 and through the dock 212 to a respective port or connection (e.g., wall outlet, external device, etc.).

FIGS. 8-12 illustrate another embodiment of a dock 312. The illustrated dock 312 is similar to the docks 12, 112, and 212 discussed above, except as otherwise described. Like elements are numbered with like reference numerals, incremented by 300.

The dock 312 secures a portable electronic device (similar to the portable electronic devices 10, 110, 210) to selectively inhibit removal of the device from the dock 312. The dock 312 includes a channel 324 and a support platform 326, and a single translatable arm 320 having a hook 322 and a body portion 330 slidable within the channel 324. It may be noted that the single arm 320 extends into the opposite end of the channel 324, as compared to the arms 116, 216 in the previous figures. While the dock 312 does not include an additional arm, an additional hook 318 caps one end of the channel 324. The additional hook 318 may be integrally formed or permanently attached (e.g., heat staked, friction welded, etc.) to the channel 324. In other embodiments, the positions of the arm 320 and the hook 318 relative to the channel 324 may be reversed. Further, in other embodiments, the dock 312 may include a second arm similar to the arm 16, thereby incorporating the additional adjustability of the two arms as described with respect to the dock 12 of FIGS. 1-5.

The arm 320 includes a side door 346 extending from the body portion 330 and supporting a protrusion 340 for extending around a portion of the portable electronic device. Unlike the side door 146 shown in FIGS. 1-5, the side door 346 does not rotate relative to a jamb. Rather, the side door 346 and the attached protrusion 340 are removable from the body portion 330 of the arm 320. Alternatively, the side door 346 and protrusion 340 may be movable (e.g., slidable) relative to the body portion 330 but not fully removable. As shown in the transition from FIG. 8 to FIG. 9, the side door 346 is movable away from the body portion 330 to provide clearance for attaching a portable electronic device to or disconnecting a portable electronic device from the dock 312.

Figure 10:
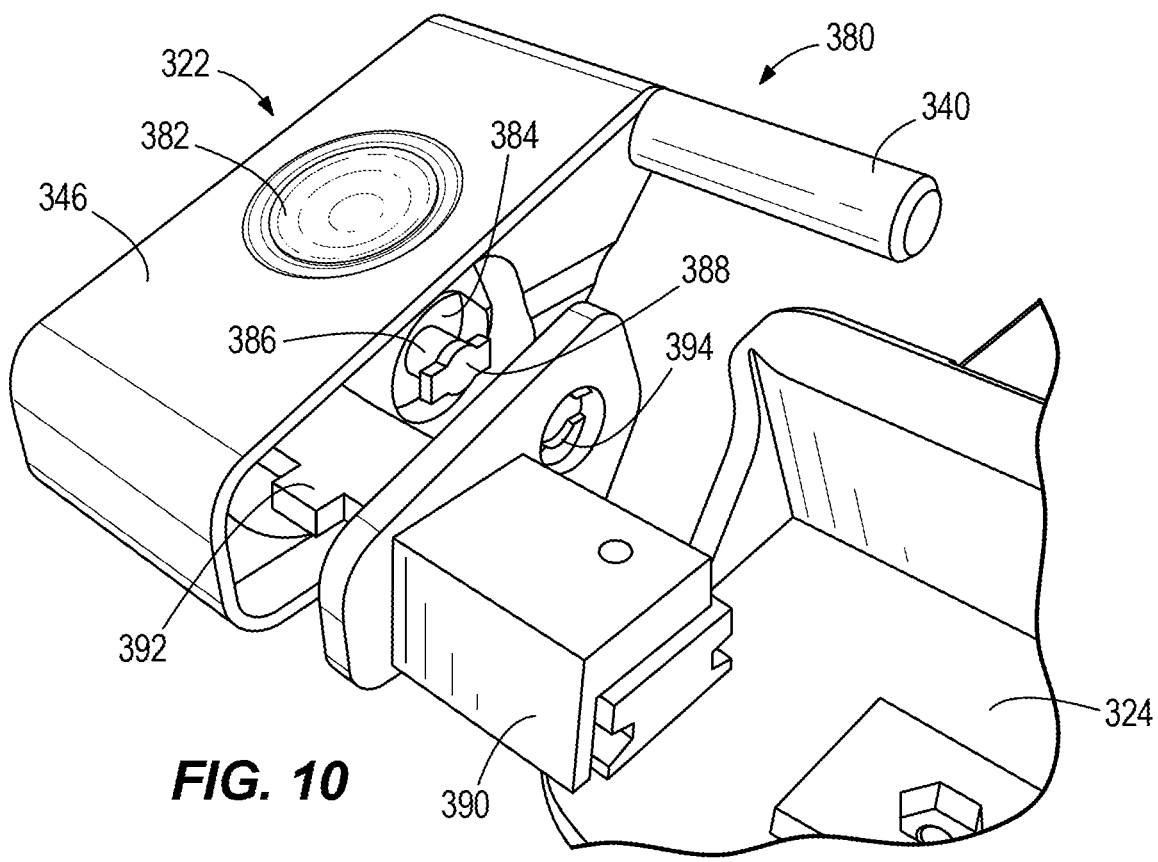
FIG. 10 is a perspective view of the electronic lock mechanism in an open position.
Figure 11:
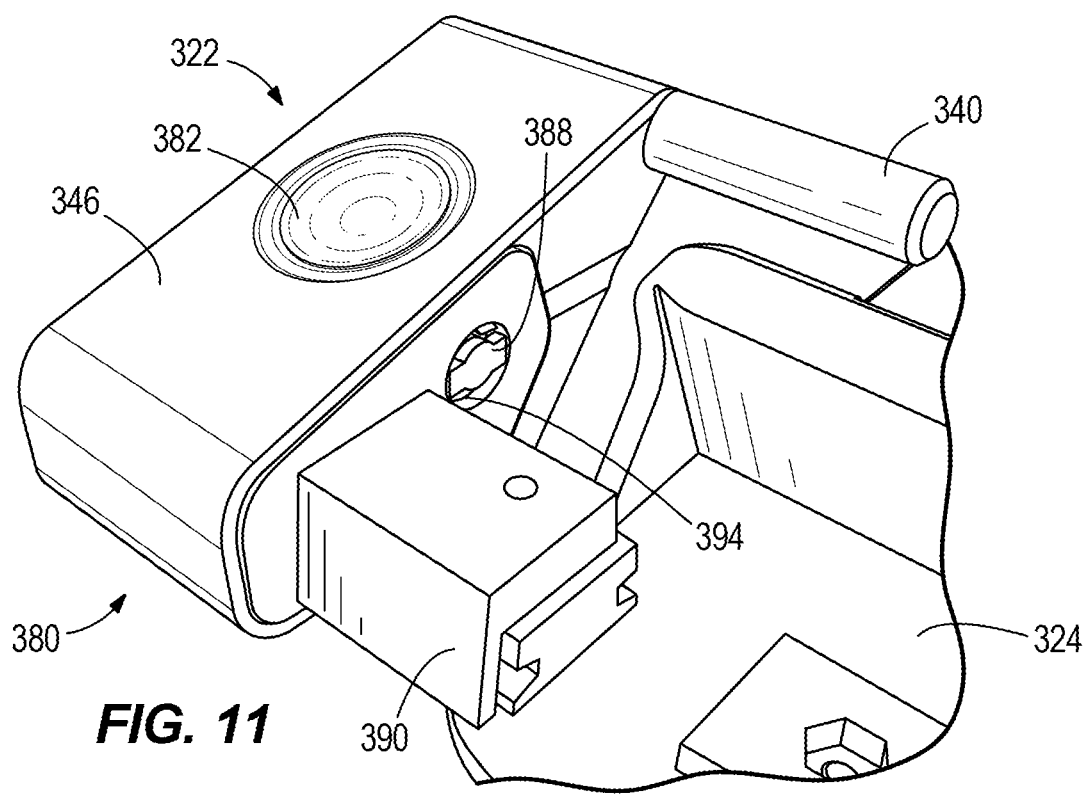
FIG. 11 is a perspective view of the electronic lock mechanism in a closed and unlocked position.
Figure 12:
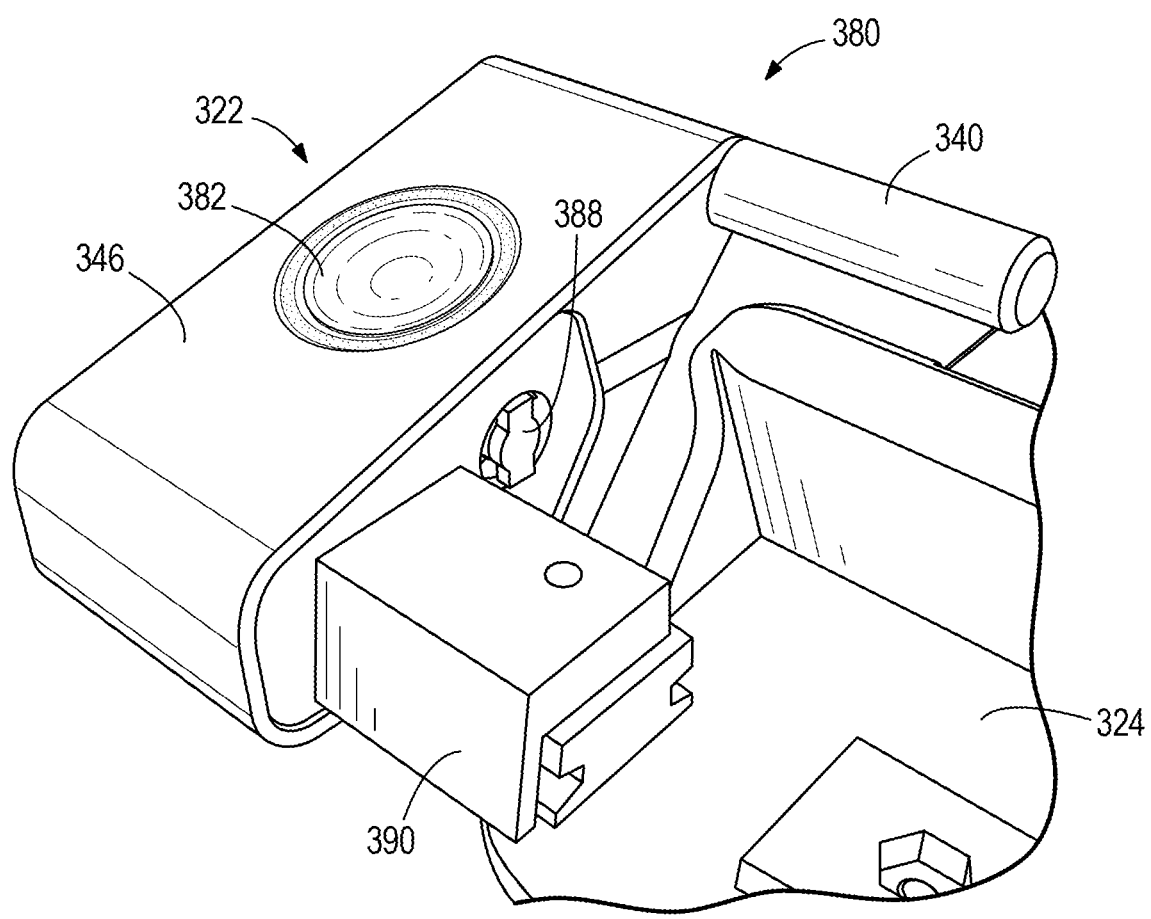
FIG. 12 is a perspective view of the electronic lock mechanism in a closed and locked position.

As shown in FIGS. 10-12, the dock 312 includes an electronic lock mechanism 380, instead of a slot for a laptop lock. The electronic lock mechanism 380 is selectively actuated via an interface 382 to lock or unlock the side door 346 to the body portion 330 of the arm 320 and to the remainder of the dock 312. The interface 382 for the electronic lock mechanism 380 may be a button that is actuatable when a wireless key, such as an RFID or Bluetooth device, is within a prescribed distance to the dock 312. Alternatively, the interface 382 may be unlockable in response to inputting a password, passcode, or other security identifier into the associated portable electronic device. Further still, the interface 382 may be a biometric sensor and may respond to a user scan (e.g., fingerprint scan, retinal scan, etc.) to actuate the mechanism 380.

In FIGS. 10-12, the body portion 330 and the channel 324 are partially cutaway to show the details of the electronic lock mechanism 380 within the body portion 330. As shown, the electronic lock mechanism 380 includes a first portion (the interface 382, a motor 384, and a motor output shaft 386) housed within the removable side door 346 and a second portion (a mounting block 390 and an alignment key 392) fixed to the body portion 330 of the arm 320. The mounting block 390 is fixed to the body portion 330 of the arm 320 (e.g., via a fastener, heat staked, friction welded, etc.) and caps the end of the body portion 330 when the side door 346 is removed. The mounting block 390 further includes an aperture 394 shaped similar to a bowtie-shaped distal end 388 of the motor output shaft 386.

In assembly of the electronic lock mechanism 380 to lock the portable electronic device to the dock 312, the side door 346 is aligned with the body portion 330 of the arm 320 by extending the alignment key 392 into a slot in the side door 346. When fully inserted, the alignment key 392 places the motor output shaft 386 into alignment with the aperture 394, and the distal bowtie end 388 of the shaft 386 extends through the similar cross-section of the aperture 394. Once fully inserted as shown in FIG. 11, the end 388 of the shaft 386 is rotated via the motor 384 a quarter-turn (i.e., 90 degrees) such that the rotated distal end 388 of the shaft 386 is no longer aligned with the bowtie-shaped aperture 394 (FIG. 12) and is not removable from the aperture 394. The motor 384 may be actuated to rotate from an unlocked position (FIG. 11; in which the side door 346 is removable from the body portion 330) to a locked position (FIG. 12; in which the side door 346 is not removable from the body portion 330) in response to user input to the interface 382. Alternatively, the motor 384 may be automatically actuated to rotate from the unlocked position to the locked position in response to insertion of the alignment key 392 into the slot. Further, the motor 384 may not be actuatable unless the alignment key 392 is inserted into the slot, thereby inhibiting the motor output shaft 386 from being placed in the locked position when the side door 346 is disassembled from the body portion 330.

In order to remove the side door 346 from the body portion 330 of the arm 320 and remove the portable electronic device from the dock 312, a user actuates the interface 382, thereby actuating the motor 384 to rotate the output shaft 386 of the motor 384 a quarter-turn. Once rotated, the bowtie-shaped distal end 388 of the output shaft 386 is aligned with the similarly-shaped aperture 394, allowing the distal end 388 of the shaft 386 to be translated therethrough. Removal of the side door 346 from the rest of the arm 320 additionally moves the protrusion 340 relative to the protrusion 336 of the fixed arm 316, thereby permitting removal of the portable electronic device from the dock 312.

FIGS. 13-19 illustrate another embodiment of a dock 412. The illustrated dock 412 is similar to the docks 12, 112, 212, and 312 discussed above, except as otherwise described. Like elements are numbered with like reference numerals, incremented by 400.

Figure 18:
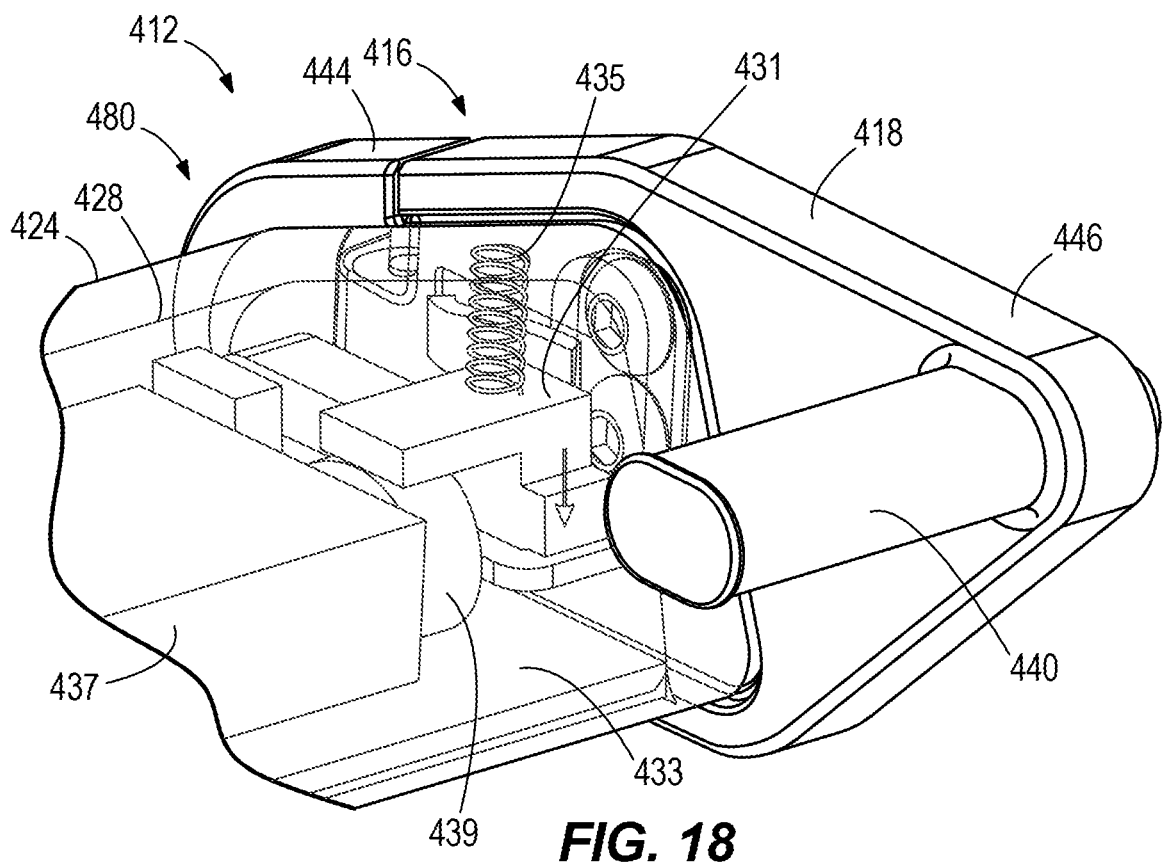
FIG. 18 is a perspective view of the electronic lock mechanism of FIG. 13 in a locked position.
Figure 19:
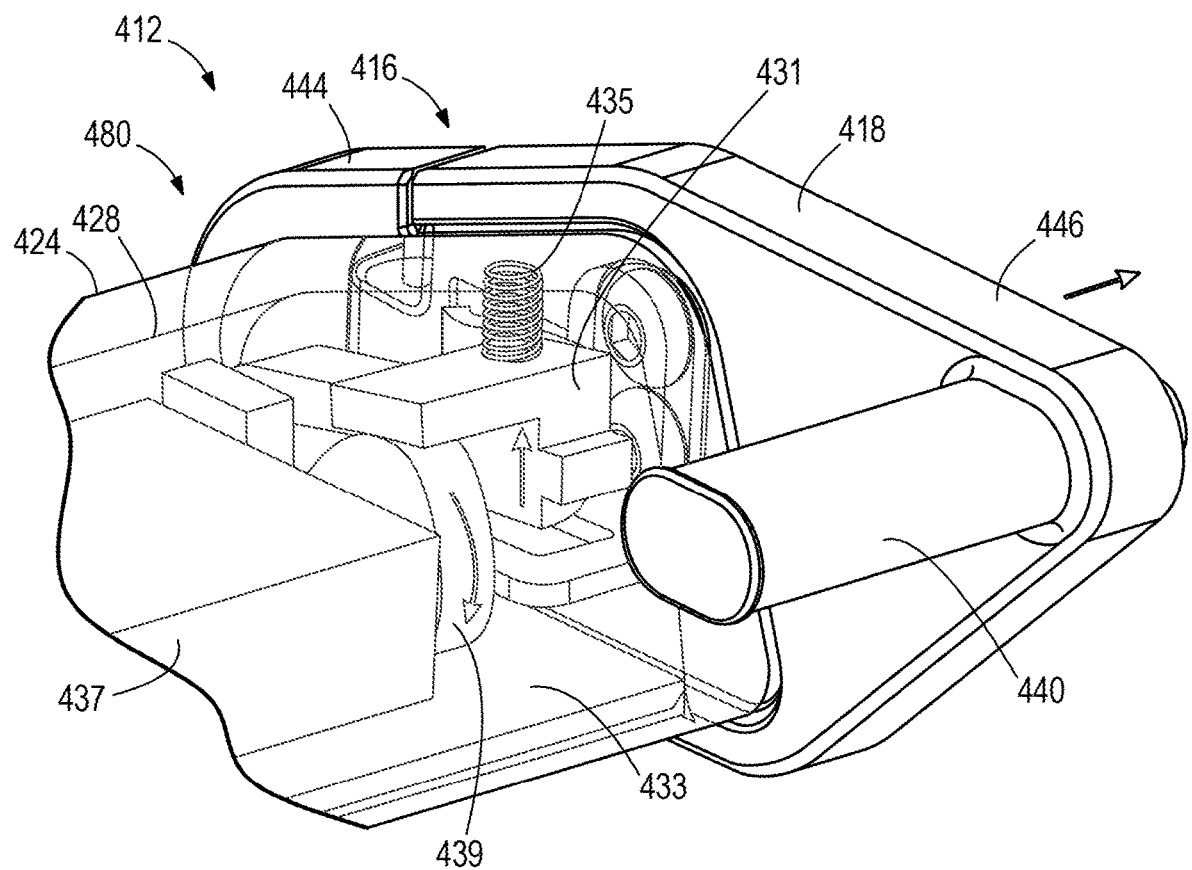
FIG. 19 is a perspective view of the electronic lock mechanism of FIG. 13 with the cam rotated to place the latch component in an unlocked position.

The dock 412 secures a portable electronic device (not shown; similar to device 10) to selectively inhibit removal of the device from the dock 412. The dock 412 includes a channel 424 and one or more translatable arms 416, each having a hook 418 and a body portion 428 that is slidable within the channel 424. The illustrated hook 418 includes a side door 446 hinged to a jamb 444 to rotate the side door 446 and an attached protrusion 440 between an open position (FIGS. 13, 16, and 17) and a closed position (FIGS. 18-19).

Figure 13:
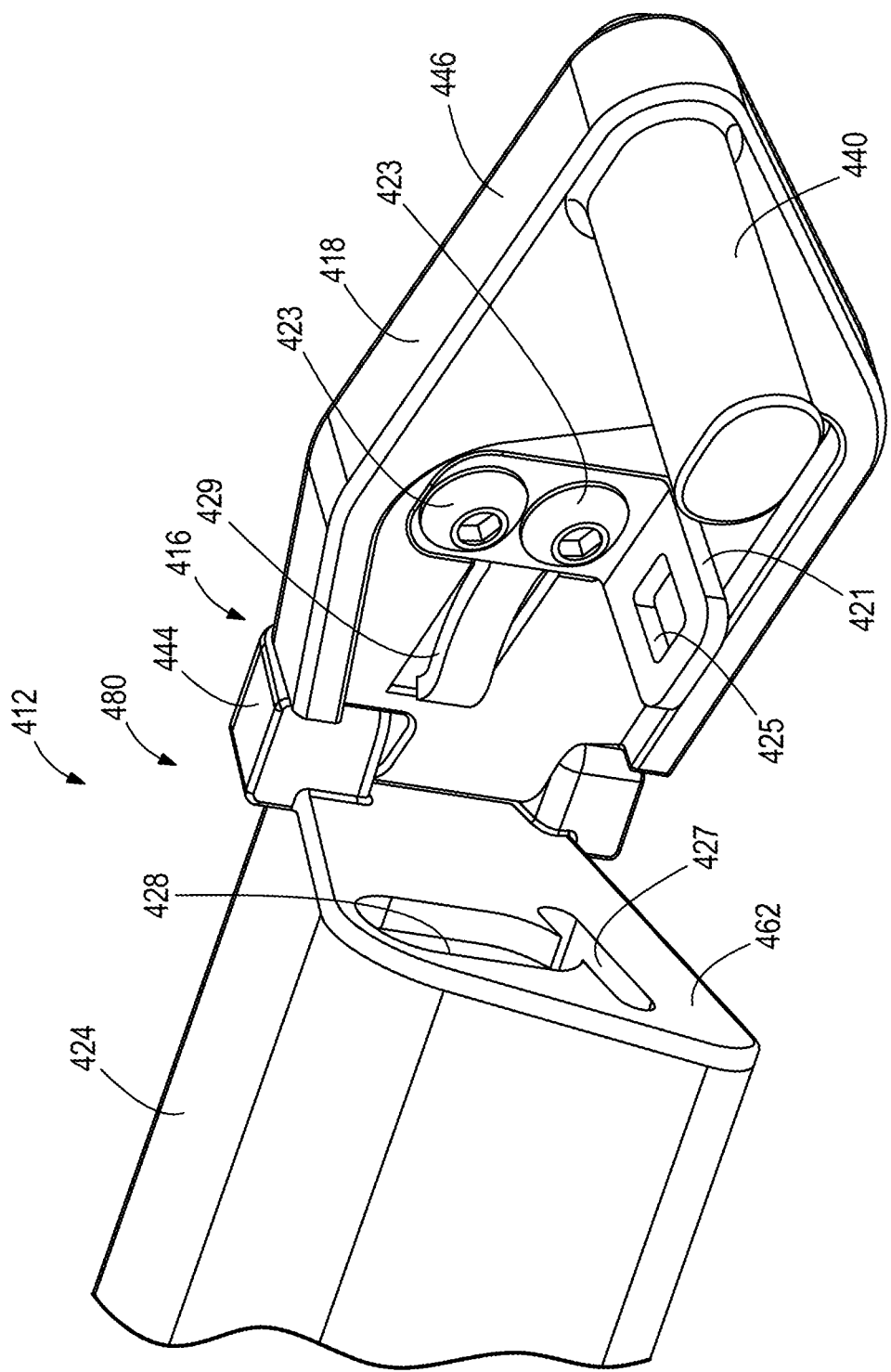
FIG. 13 is a perspective view of an electronic lock mechanism for a dock, according to another embodiment.

As shown in FIG. 13, an electronic lock mechanism 480 of the dock 412 includes a striker plate 421. The striker plate 421 is attached (e.g., via fasteners 423) to the side door 446 to rotate with the side door 446 relative to the channel 428. The striker plate 421 includes an aperture 425 and extends perpendicular to the side door 446 to extend into the channel 428 when the side door 446 is closed. The channel 428 includes a cover 462 having an opening 427. The opening 427 provides access through the cover 462, and into the channel 428 and body portion 428. The striker plate 421 extends into the opening 427 (FIG. 17) as the side door 446 closes. A spring feature 429 is additionally attached to the side door 446 to bias the side door 446 into an open position when the striker plate 421 is disengaged from a latch 431.

Figure 16:
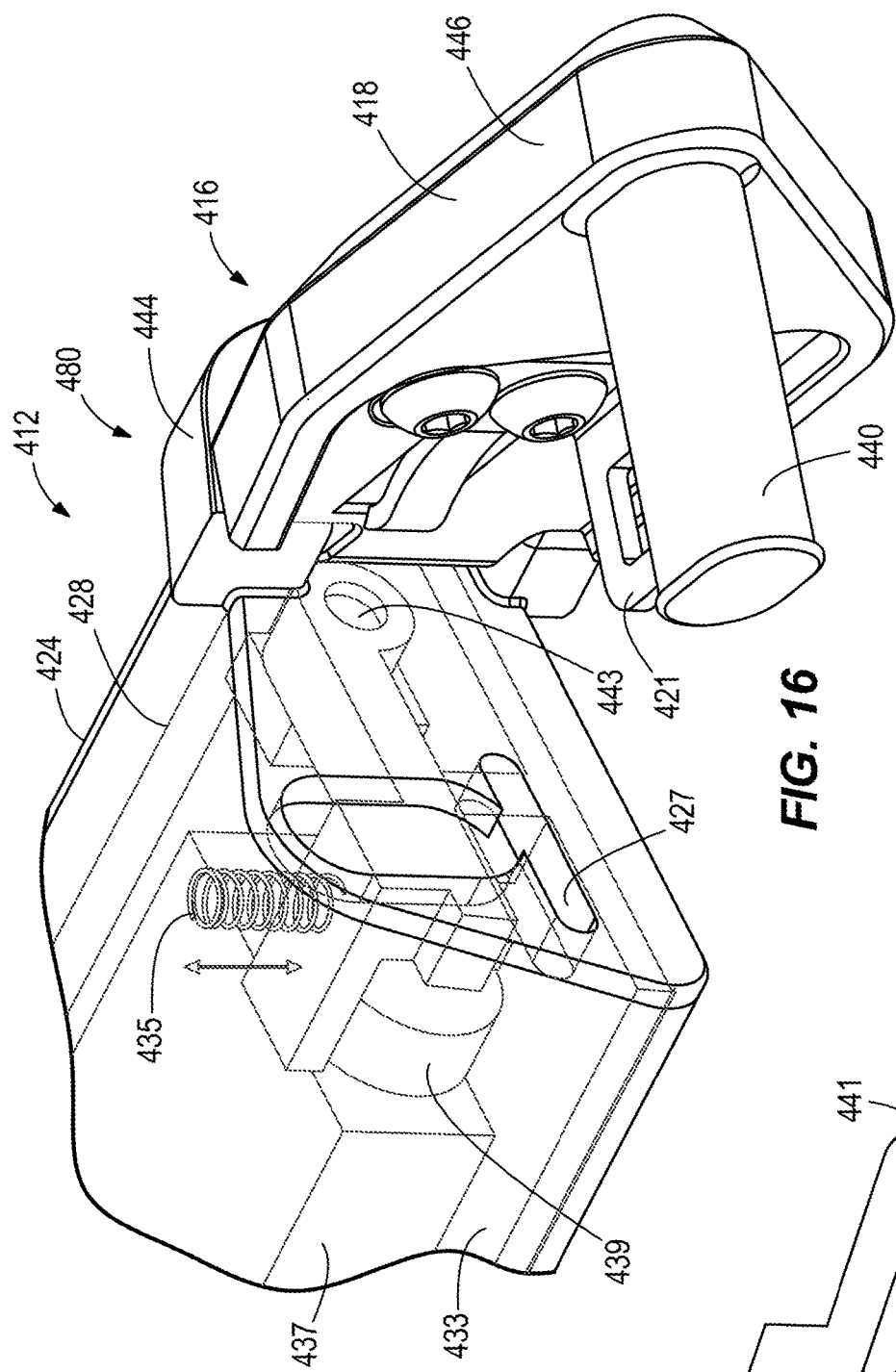
FIG. 16 is a perspective view of the electronic lock mechanism of FIG. 13, illustrating elements of the lock mechanism located within a body portion of the dock.
Figure 15:
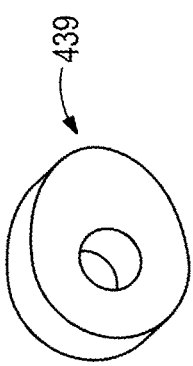
FIG. 15 is a perspective view of a cam of the electronic lock mechanism of FIG. 13.
Figure 14:
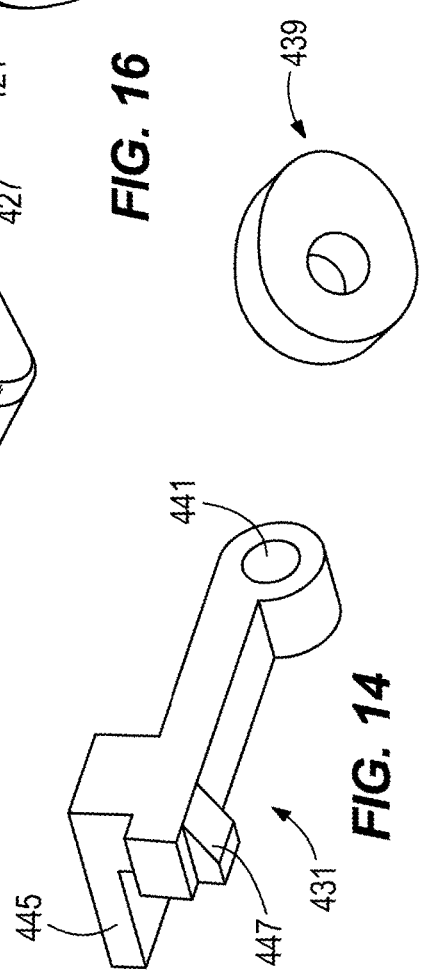
FIG. 14 is a perspective view of a latch component of the electronic lock mechanism of FIG. 13

As shown in FIG. 16, the electronic lock mechanism 480 further includes the latch 431, a base plate 433, a spring 435, an actuator 437, and a cam 439. The latch 431 includes an aperture 441 (FIG. 14) for mounting to a post 443 (FIG. 16) on the base plate 433. As shown in FIGS. 14 and 16, the latch 431 further includes a cam surface 445 that rests upon a surface of the cam 439, and a locking feature 447 that interacts with the aperture 425 of the striker plate 421 when locking and unlocking. The locking feature 447 of the latch 431 includes a ramped surface on one side.

Figure 17:
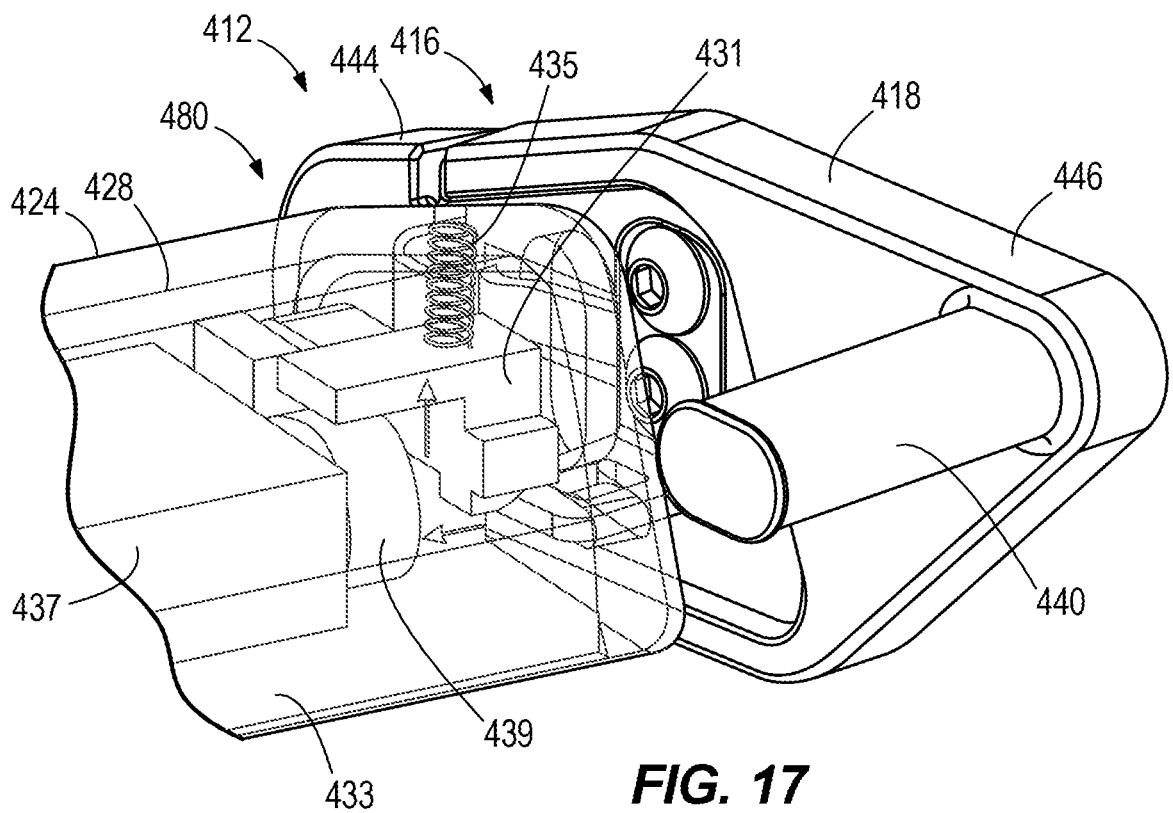
FIG. 17 is a perspective view of the electronic lock mechanism of FIG. 13 as a striker contacts the latch component.

To lock the side door 446 to the body portion 428, the side door 446 is rotated to move the striker plate 421 into the opening 427 in the cover 462, as shown in FIG. 17. The front surface of the striker plate 421 contacts the ramped surface of the locking feature 447. With continued pressure applied to the side door 446, the striker plate 421 displaces the latch 431, rotating the latch 431 about the post 443 and against a spring force of the spring 435 until the locking feature 447 extends into the aperture 425 of the striker plate 421, as shown in FIG. 18. The spring 435 biases the locking feature 447 into the aperture 425 (i.e., downward in FIGS. 17-18), thereby prohibiting further rotation of the side door 446 and locking the protrusion 440 about the portable electronic device.

To unlock the side door 446, the actuator 437 (e.g., a motor, a solenoid, etc.) rotates the cam 439 a quarter-turn, as shown in FIG. 19. Alternatively, the actuator 437 can rotate the cam 439 a different amount of rotation (e.g., an eighth of a turn, a half-turn, a full rotation, etc.) to disengage the locking feature 447. As shown, the cam 439 is mounted to an output shaft of the actuator 437. Upon rotation, the cam 439 displaces the latch 431 by maintaining contact between the cam 439 and the cam surface 445 of the latch 431, rotating the latch 431, and overcoming the opposing force of the spring 435. The rotation of the cam 439 rotates the latch 431 enough to disengage the locking feature 447 from the aperture 425 in the striker plate 421 and allowing the spring feature 429 to spring open the side door 446.

In some embodiments, the actuator 437 may be activated in response to a wireless signal. For example, the actuator 437 may be temporarily energized to move the cam 439 when the actuator 437 receives a signal from an RFID tag, a Bluetooth device, or another near-field communication (NFC) device. In other embodiments, the dock 412 may include a user interface that is electrically coupled to the actuator 437. The user interface may include, for example, a button having a biometric sensor (e.g., a fingerprint reader) that, when depressed by an authorized user, temporarily energizes the actuator 437. In further embodiments, the actuator 437 may be activated in response to a signal from the portable electronic device that is secured to the dock 412. For example, the portable electronic device may communicate with the dock 412 through a wireless or hardline connection. A user may enter a passcode or other identifier into the portable electronic device to selectively energize the actuator 437. Alternatively, the actuator 437 may include a mechanical mechanism, such as a lock cylinder and/or linkage, to move the cam 439. In such embodiments, the actuator 437 may be actuated by inserting a key into the dock 412 and rotating the key.

Figure 20:
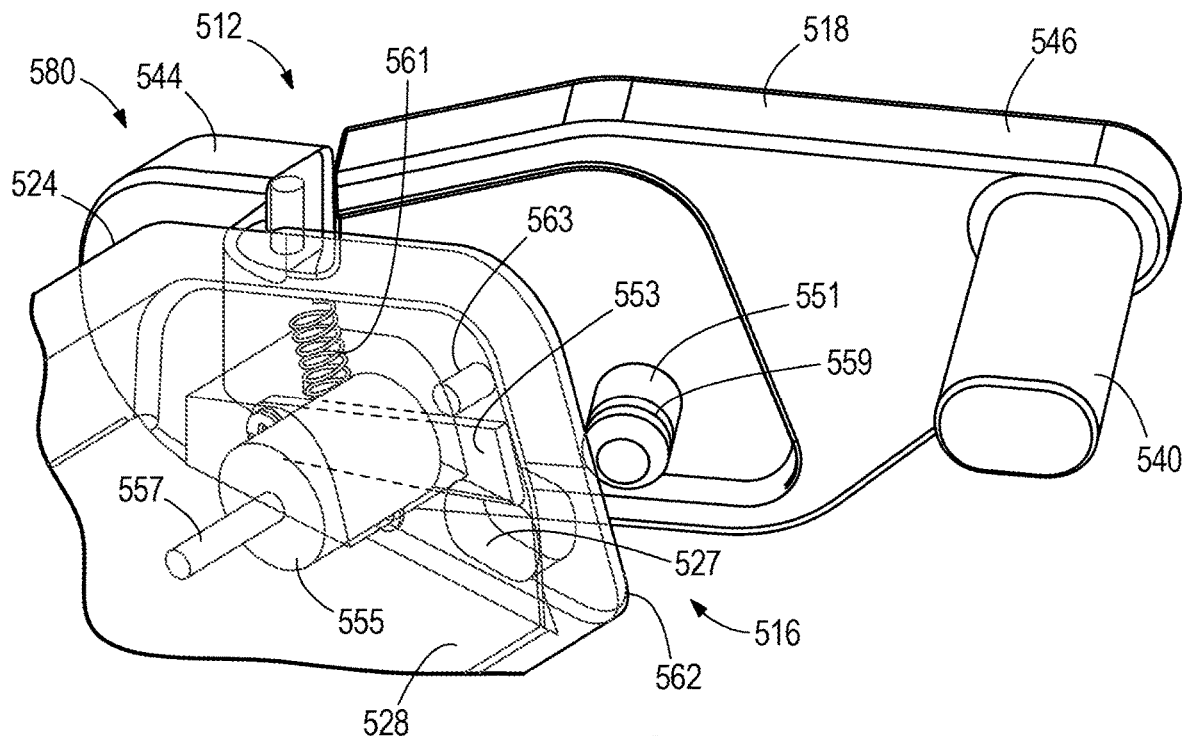
FIG. 20 is a perspective view of another electronic lock mechanism in an unlocked position, the lock mechanism including a spring-loaded gate.
Figure 21:
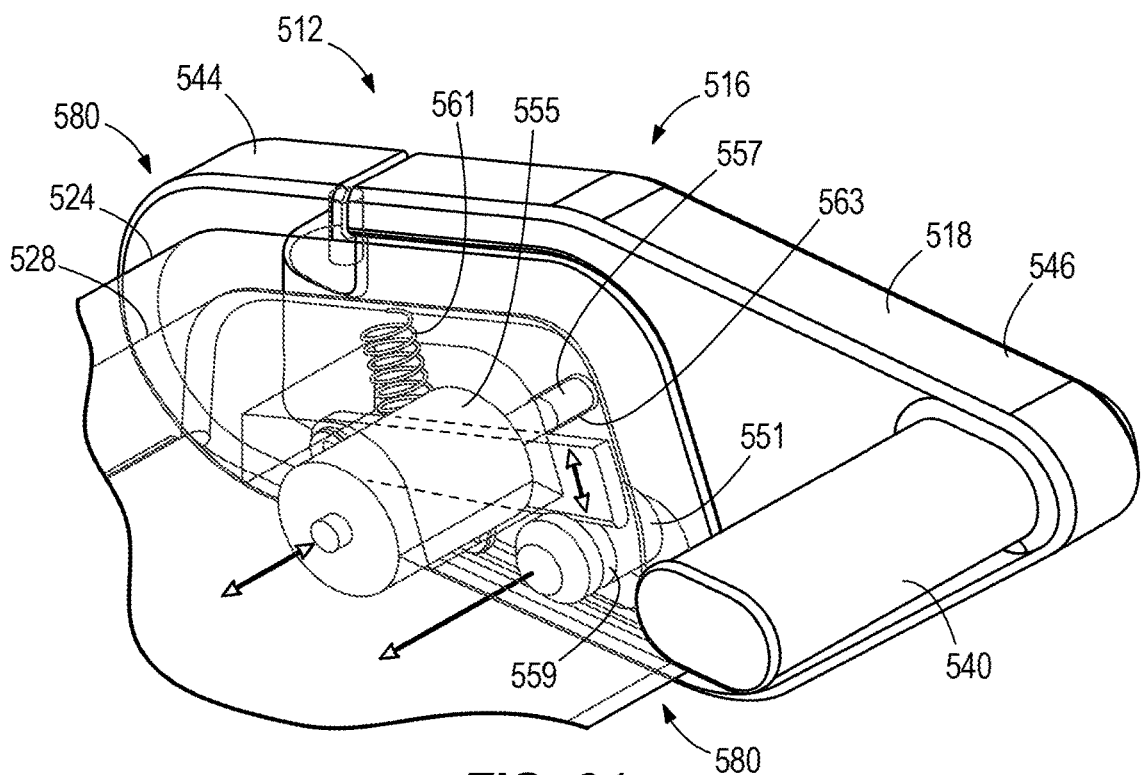
FIG. 21 is a perspective view of the electronic lock mechanism of FIG. 20 in a locked position.

FIGS. 20-21 illustrate another embodiment of a dock 512. The illustrated dock 512 is similar to the docks 12, 112, 212, 312, and 412 discussed above, except as otherwise described. Like elements are numbered with like reference numerals, incremented by 500.

The dock 512 secures a portable electronic device (not shown; similar to device 10) to selectively inhibit removal of the device from the dock 512. The dock 512 includes a channel 524 and one or more translatable arms 516, each having a hook 518 and a body portion 528 that is slidable within the channel 524. The illustrated hook 518 includes a side door 546 hinged to a jamb 544 to rotate the side door 546 and an attached protrusion 540 between an open position (FIG. 20) and a closed position (FIG. 21).

An electronic lock mechanism 580 includes a post 551, a gate 553, and an actuator 555 (e.g., a motor, a solenoid, etc.) including an output shaft 557. The post 551 is fixed to the side door 546 and includes a slot 559 that forms a detent. Though shown as a circumferential slot, the slot 559 may alternatively be a single cut in one side of the post 551. When the side door 546 is rotated from the open position (FIG. 20) to the closed position (FIG. 21) the post 551 extends through an opening 527 of a cover 562 and into the channel 524 and body portion 528. The post 551 includes a ramped surface such that contact between the post 551 and the gate 553 pushes the gate 553 against a spring 561, thereby compressing the spring 561 until the gate 553 rests within the slot 559. The slot 559 is ramped or curved such that a user can overcome the spring force to remove the gate 553 from the slot 559.

To lock the gate 553 within the slot 559 in the post 551, the actuator 555 is energized to translate the output shaft 557 from a first, retracted position (FIG. 20) to a second, extended position (FIG. 21) and into a second opening 563 in the cover 562. When in the second position, the output shaft 557 prohibits movement of the gate 553 out of the slot 559 and, thereby, disengagement of the gate 553 from the post 551. To unlock the mechanism 580, the output shaft 557 is translated from the second position back to the first position, allowing a user to pull the side door 546 away from the cover 562. The illustrated actuator 555 may be activated in any of the same ways as the actuator 437 described above.

In this embodiment, the side door 546 can remain closed, even when unlocked. Further, the lock mechanism 580 can be set as locked or unlocked and the actuator 555 does not use power, except in changing state. Additionally, the side door 546 can be left open for easy installation of the portable electronic device.

Figure 22:
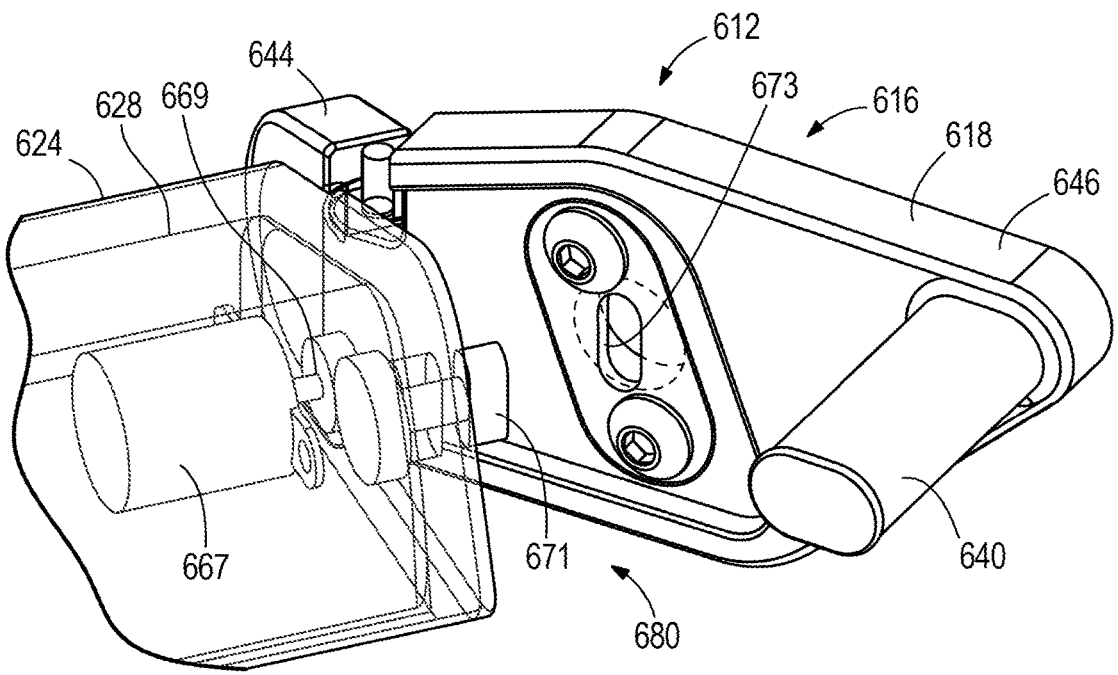
FIG. 22 is a perspective view of yet another electronic lock mechanism in an unlocked position, the lock mechanism including a rotatable T-bar.
Figure 23:
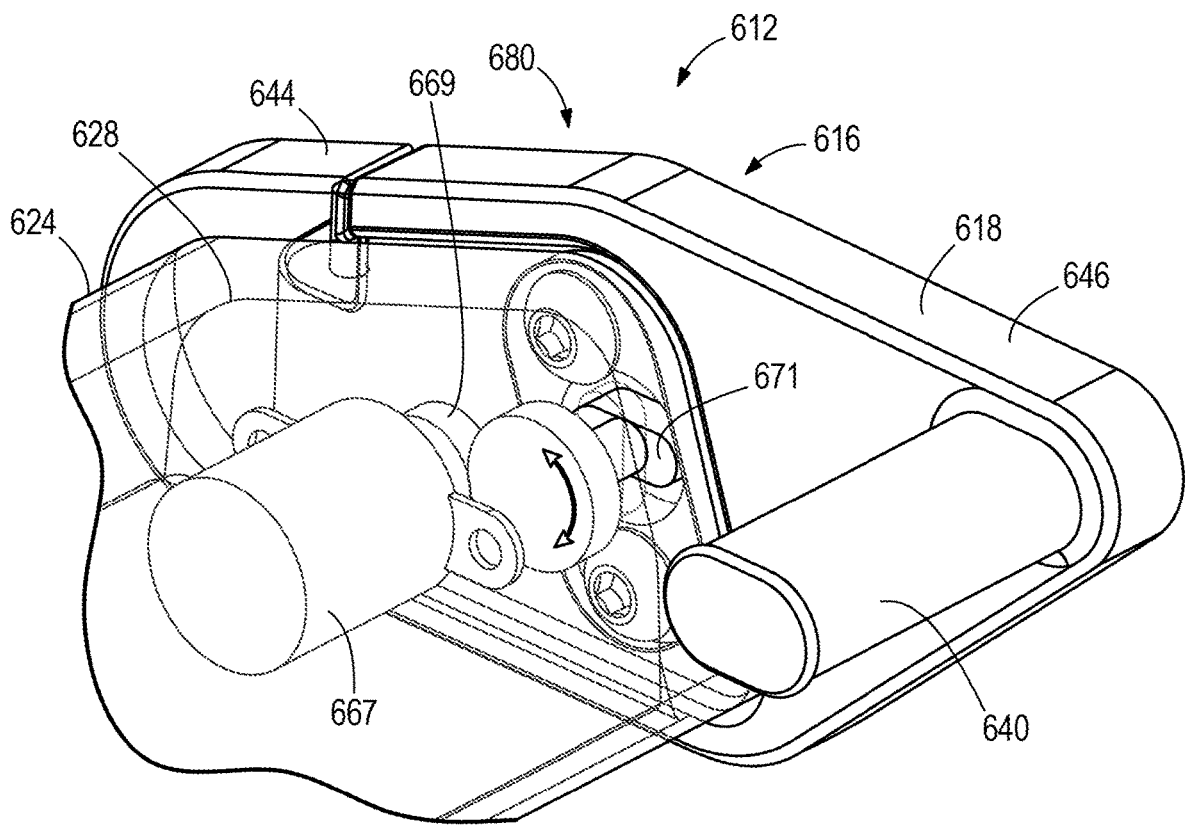
FIG. 23 is a perspective view of the electronic lock mechanism of FIG. 22 in a locked position.

FIGS. 22-23 illustrate another embodiment of a dock 612. The illustrated dock 612 is similar to the docks 12, 112, 212, 312, 412, and 512 discussed above, except as otherwise described. Like elements are numbered with like reference numerals, incremented by 600.

The dock 612 secures a portable electronic device (not shown; similar to device 10) to selectively inhibit removal of the device from the dock 612. The dock 612 includes a channel 624 and one or more translatable arms 616, each having a hook 618 and a body portion 628 that is slidable within the channel 624. The illustrated hook 618 includes a side door 646 hinged to a jamb 644 to rotate the side door 646 and an attached protrusion 640 between an open position (FIG. 22) and a closed position (FIG. 23).

An electronic lock mechanism 680 includes an actuator 667 (e.g., a motor, a solenoid, etc.) including an output shaft 669, a T-bar 671, and a slot 673 in the side door 646. The T-bar 671 is elongated perpendicular to a rotational axis and is capable of rotation in response to input from the actuator 667. As shown, the output shaft 669 of the actuator 667 includes a gear that meshes with a gear of the T-bar 671. Alternatively, the T-bar 671 may be mounted directly to the output shaft 669. The slot 673 is elongated to accept the elongated T-bar 671 in only certain orientations. In order to lock the side door 646 to the channel 624, a user rotates the side door 646 until the T-bar 671 extends into and through the slot 673. Then, the actuator 667 is energized to rotate the T-bar 671 a quarter-turn, thereby misaligning the elongated T-bar 671 and slot 673 and prohibiting removal of the T-bar 671 from the slot 673. To unlock the side door 646, the actuator 667 is once again actuated to rotate the T-bar 671 a quarter-turn, realigning the T-bar 671 with the slot 673 and permitting removal of the T-bar from the slot 673. The illustrated actuator 667 may be activated in any of the same ways as the actuator 437 described above.

In this embodiment, the lock mechanism 680 can be set as locked or unlocked and does not use power, except in changing state. Additionally, the side door 646 can be left open for easy installation of the portable electronic device. Further still, the mechanism 680 includes relatively few moving parts (i.e., the actuator 667 and the T-bar 671.

Figure 24:
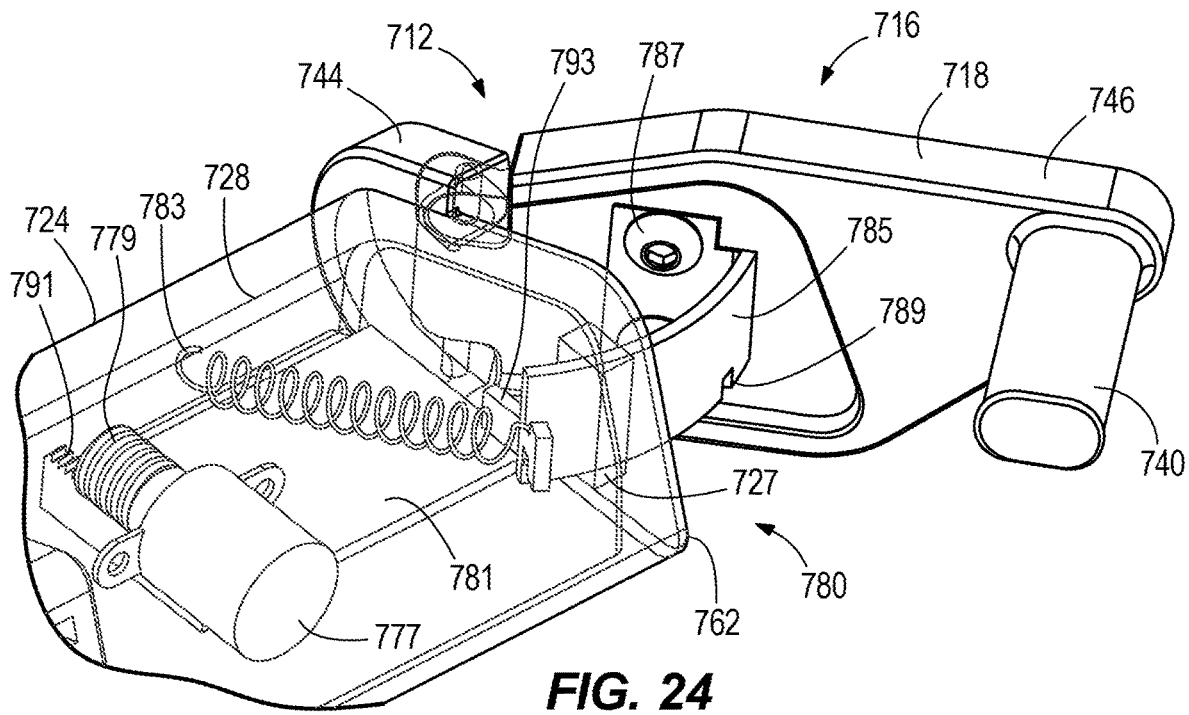
FIG. 24 is a perspective view of yet another electronic lock mechanism in an unlocked position, the lock mechanism including a sliding gate.
Figure 25:
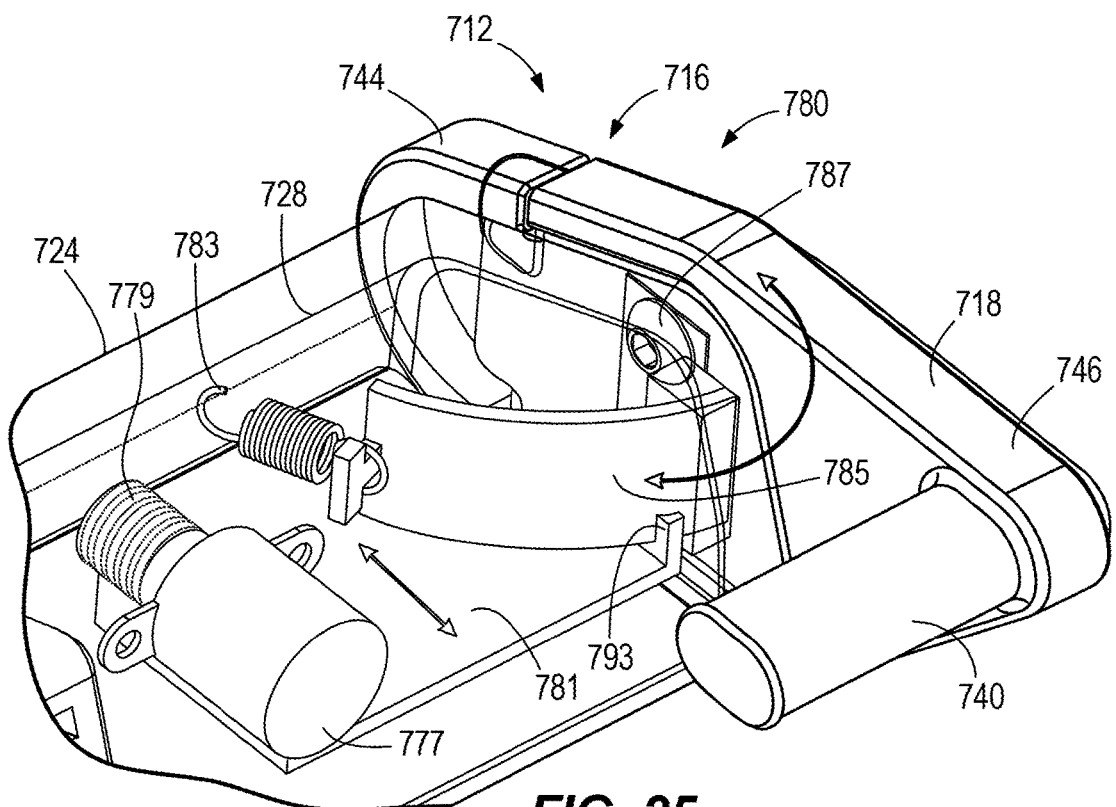
FIG. 25 is a perspective view of the electronic lock mechanism of FIG. 24 in a locked position.

FIGS. 24-25 illustrate another embodiment of a dock 712. The illustrated dock 712 is similar to the docks 12, 112, 212, 312, 412, 512, and 612 discussed above, except as otherwise described. Like elements are numbered with like reference numerals, incremented by 700.

The dock 712 secures a portable electronic device (not shown; similar to device 10) to selectively inhibit removal of the device from the dock 712. The dock 712 includes a channel 724 and one or more translatable arms 716, each having a hook 718 and a body portion 728 that is slidable within the channel 724. The illustrated hook 718 includes a side door 746 hinged to a jamb 744 to rotate the side door 746 and an attached protrusion 740 between an open position (FIG. 24) and a closed position (FIG. 25).

An electronic lock mechanism 780 includes an actuator 777 (e.g., a motor, a solenoid, etc.), a worm gear 779 on an output shaft of the actuator 777, a sliding gate 781, a spring 783, and an arm 785. The arm 785 is fixed to the side door 746 (e.g., via a fastener 787) at one end and is attached to an inner surface of the body portion 728 via the spring 783 at the other end. The arm 785 is curved to maintain a constant radius relative to the rotational axis of the side door 746 and extends into the body portion 728 through an opening 727 in a cover 762 of the channel 724. The spring 783 exerts a force on the arm 785 to bias the side door 746 into the closed position. The arm 785 includes a slot 789 for mating with the sliding gate 781. The sliding gate 781 includes a gear rack 791 for mating with the worm gear 779 and a projection 793 for mating with the slot 789.

To lock the side door 746 in the closed position relative to the body portion 728, the spring 783 biases the side door 746 closed by exerting the spring force on the arm 785. Then, the actuator 777 is driven to rotate the worm gear 779, translating the sliding gate 781 in response to the contact between the worm gear 779 and the gear rack 791. The sliding gate 781 may translate along tracks within the body portion 728. As the sliding gate 781 translates, the projection 793 slides through the slot 789 in the arm 785, thereby locking the arm 785 in the closed position. To unlock the side door 746, the actuator 777 drives the worm gear 779 in an opposite direction, thereby translating the projection 793 out of the slot 789 in the arm 785. The illustrated actuator 777 may be activated in any of the same ways as the actuator 437 described above.

In this embodiment, the lock mechanism 780 can be set as locked or unlocked and does not use power, except in changing state. Additionally, the mechanism cannot be locked when the side door 746 is open. Further still, the side door 746 is always biased closed and spring loaded. Alternatively, the mechanism 780 may be utilized without the spring 783 biasing the arm 785 into the closed position.

Figure 26:
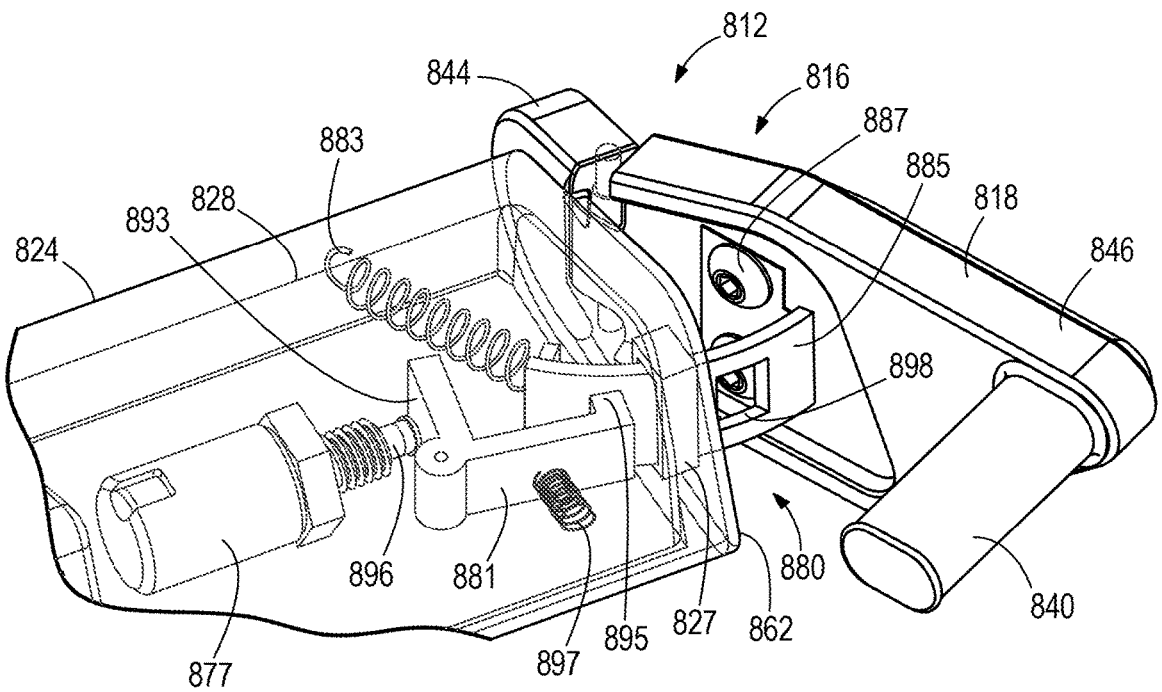
FIG. 26 is a perspective view of yet another electronic lock mechanism in an unlocked position, the lock mechanism including a spring-loaded gate.
Figure 27:
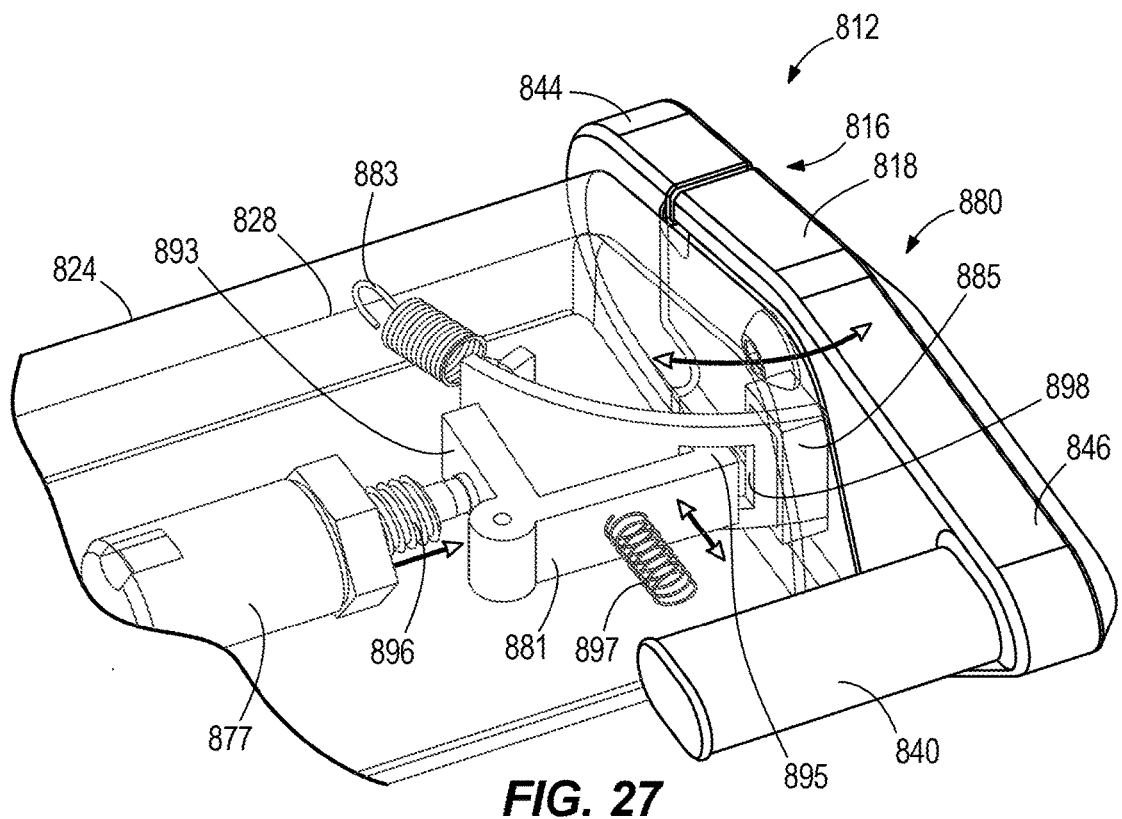
FIG. 27 is a perspective view of the electronic lock mechanism of FIG. 26 in a locked position.

FIGS. 26-27 illustrate another embodiment of a dock 812. The illustrated dock 812 is similar to the docks 12, 112, 212, 312, 412, 512, 612, and 712 discussed above, except as otherwise described. Like elements are numbered with like reference numerals, incremented by 800.

The dock 812 secures a portable electronic device (not shown; similar to device 10) to selectively inhibit removal of the device from the dock 812. The dock 812 includes a channel 824 and one or more translatable arms 816, each having a hook 818 and a body portion 828 that is slidable within the channel 824. The illustrated hook 818 includes a side door 846 hinged to a jamb 844 to rotate the side door 846 and an attached protrusion 840 between an open position (FIG. 26) and a closed position (FIG. 27).

An electronic lock mechanism 880 includes an actuator 877 (e.g., a motor, a solenoid, etc.), an output shaft 896 of the actuator 877, a rotatable gate 881, a first spring 883, a second spring 897, and an arm 885. The arm 885 is fixed to the side door 846 (e.g., via a fastener 887) at one end and is attached to an inner surface of the body portion 828 via the spring 883 at the other end. The arm 885 is curved to maintain a constant radius relative to the rotational axis of the side door 846 and extends into the body portion 828 through an opening 827 in a cover 862 of the channel 824. The spring 883 exerts a force on the arm 885 to bias the side door 846 into the closed position. The arm 885 includes an aperture 898 for mating with the rotatable gate 881. The rotatable gate 881 includes a first portion 893 for contact with the output shaft 896 of the actuator 877 and a second portion for mating with the aperture 898 in the arm 885. The illustrated second portion includes a projection 895 that fits within the aperture 898.

To lock the side door 846 in a closed position relative to the body portion 828, the spring 883 biases the side door 846 closed by exerting the spring force on the arm 885. When closed, the second spring 897 biases the projection 895 into the aperture 898 in the arm 885, thereby locking the arm 885 in the closed position. To unlock the side door 846, the actuator 877 translates the output shaft 896 to contact the first portion 893 of the gate 881, thereby rotating the gate 881. More specifically, the output shaft 896 pushes the first portion 893 to overcome the spring force of the second spring 897 and rotate the projection 895 out of alignment with the aperture 898 in the arm 885. The illustrated actuator 877 may be activated in any of the same ways as the actuator 437 described above.

In this embodiment, the side door can be locked at any time the actuator 877 is unpowered. Therefore, a user does not need to actuate the actuator 877 to lock a portable electronic device to the dock 812.

Figure 28:
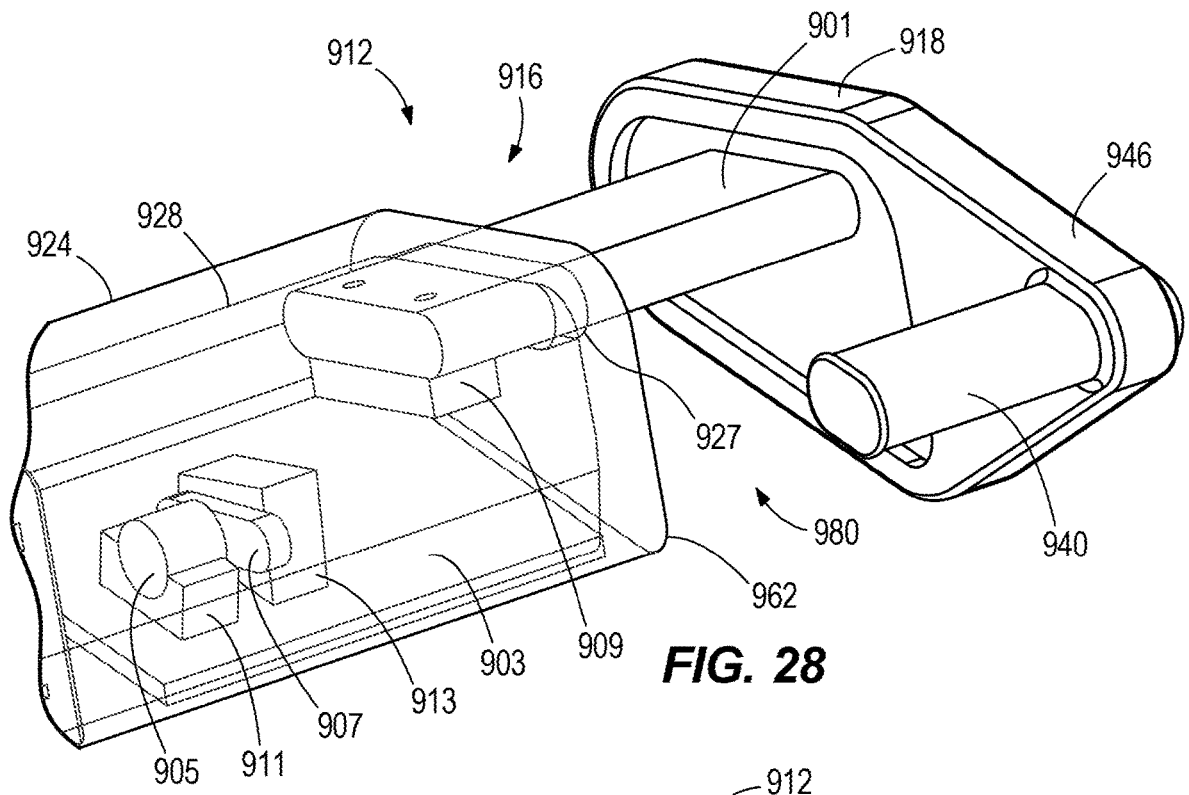
FIG. 28 is a perspective view of yet another electronic lock mechanism in an unlocked position, the lock mechanism including a sliding door.
Figure 29:
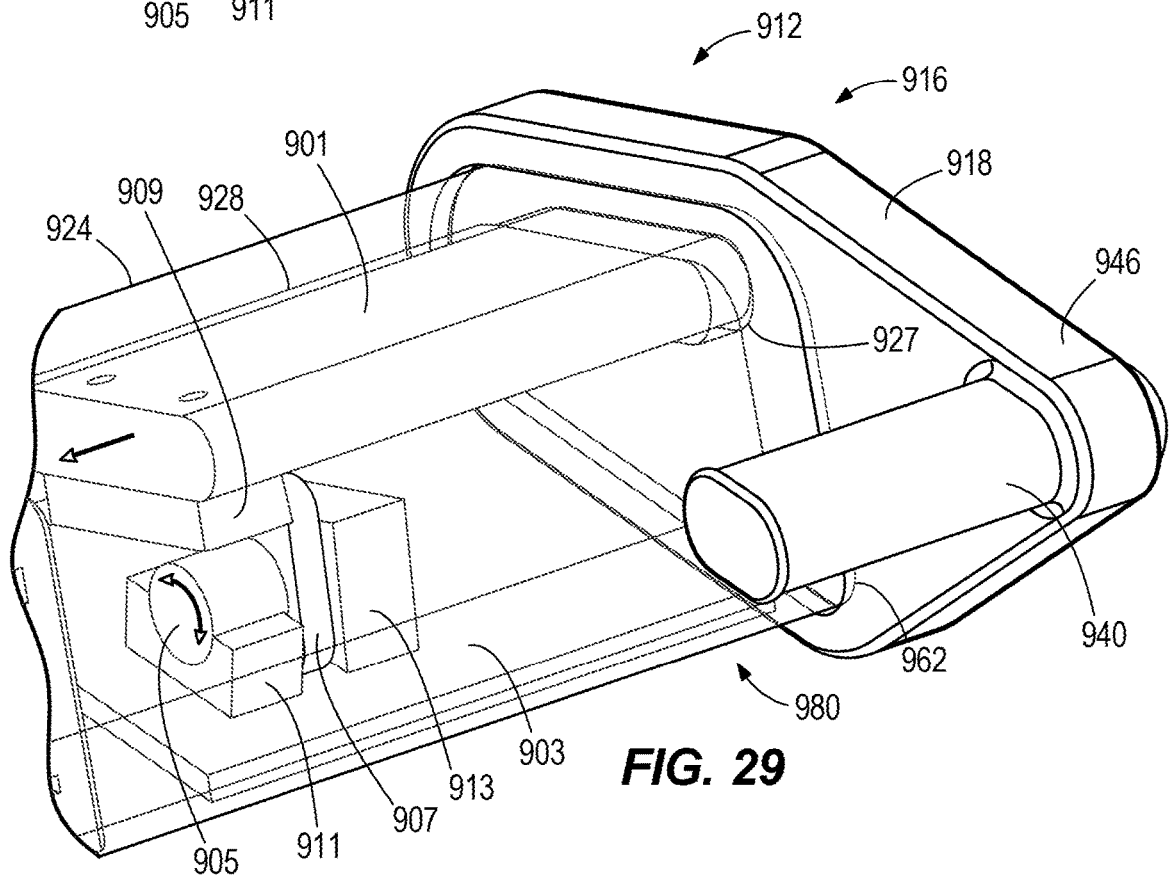
FIG. 29 is a perspective view of the electronic lock mechanism of FIG. 28 in a locked position.

FIGS. 28-29 illustrate another embodiment of a dock 912. The illustrated dock 912 is similar to the docks 12, 112, 212, 312, 412, 512, 612, 712, and 812 discussed above, except as otherwise described. Like elements are numbered with like reference numerals, incremented by 900.

The dock 912 secures a portable electronic device (not shown; similar to device 10) to selectively inhibit removal of the device from the dock 912. The dock 912 includes a channel 924 and one or more translatable arms 916, each having a hook 918 and a body portion 928 that is slidable within the channel 924. The hook 918 includes a sliding side door 946 and a protrusion 940. The illustrated hook 918 is slidable between a first position (FIG. 28) in which a portable electronic device is removable from the dock 912, and a second position (FIG. 29) in which the hook 918 is lockable to the body portion 928, thereby prohibiting removal of the electronic device from the dock 912.

An electronic lock mechanism 980 includes a boss 901 fixed to or integral with the side door 946, a base plate 903, an actuator 905 (e.g., a motor, a solenoid, etc.), and a locking paddle 907 mounted on an output shaft of the actuator 905. The boss 901 extends into the body portion 928 through an opening 927 in a cover 962 of the channel 924. The boss 901 includes a stopper block 909 mounted to a distal end (i.e., away from the side door 946) of the boss 901 to inhibit removal of the side door 946 from the body portion 928. The boss 901 is slidable along the opening 927 and may further slide along tracks within the body portion 928. The base plate 903 is mounted within the body portion 928 and includes a first raised portion 911 (i.e., a mounting point 911 for the actuator 905) and a second raised portion 913.

In order to lock the side door 946 to the body portion 928, the boss 901 is slidably translated into the fully engaged position, in which the side door 946 abuts the channel 924. In this position, the locking paddle 907 is located between the side door 946 and the stopper block 909. The actuator 905 is then energized to rotate the locking paddle 907 a quarter-turn, thereby blocking translation of the boss 901 and prohibiting movement of the side door 946 relative to the body portion 928. Further, the raised portions 911, 913 are located adjacent to the locking paddle 907 to inhibit a user from bending or breaking the locking paddle 907 and removing the side door 946 without unlocking the lock mechanism 980. To unlock the side door 946 from the body portion 928, the actuator 905 is energized to rotate the locking paddle 907 another quarter-turn, thereby permitting sliding translation of the boss 901. The illustrated actuator 905 may be activated in any of the same ways as the actuator 437 described above.

In this embodiment, the lock mechanism 980 can be set as locked or unlocked and does not use power, except in changing state. Additionally, the side door 946 is simpler, as it does not require a hinge.

FIGS. 30-35 illustrate another embodiment of a dock 1012. The illustrated dock 1012 is similar to the docks 12, 112, 212, 312, 412, 512, 612, 712, 812, and 912 discussed above, except as otherwise described. Like elements are numbered with like reference numerals, incremented by 1000.

The dock 1012 secures a portable electronic device (not shown; similar to device 10) to selectively inhibit removal of the device from the dock 1012. The dock 1012 includes a channel 1024 and two arms 1016, 1020, with at least one of the arms being translatable. The first arm 1016 has a first hook 1018 and a first body portion 1028 and the second arm 1020 has a second hook 1022 and a second body portion (similar to body portion 30 shown in FIG. 5). Each arm 1016, 1022 is slidable within the channel 1024. The hook 1018 of the first arm 1016 rotates, slides, or is otherwise movable/removable (as shown in FIGS. 1-29) to provide clearance for attaching the portable electronic device to or disconnecting the portable electronic device from the dock 1012. In other words, when the first hook 1018 is in a first position, the hook 1018 prohibits removal or insertion of the portable electronic device between the hook 1018 and the base 1014. When the first hook 1018 is in a second position, the hook 1018 permits removal or insertion of the portable electronic device from the dock 1012. Alternatively or additionally, the hook 1022 of the second arm 1020 may rotate, slide, or be otherwise movable/removable to provide the necessary clearance to insert and remove the portable electronic device.

Figure 30:
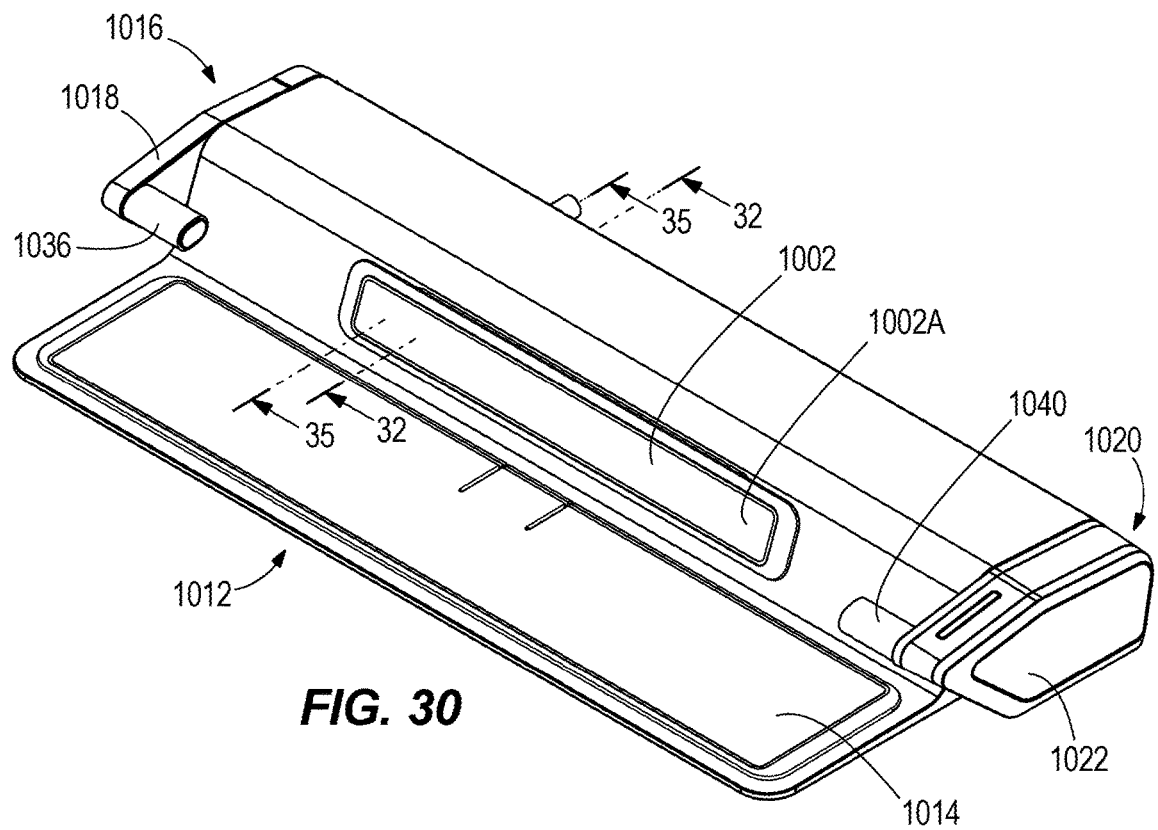
FIG. 30 is a perspective view of another dock for securing a portable electronic device, the dock having a base and a lock bar.
Figure 31:
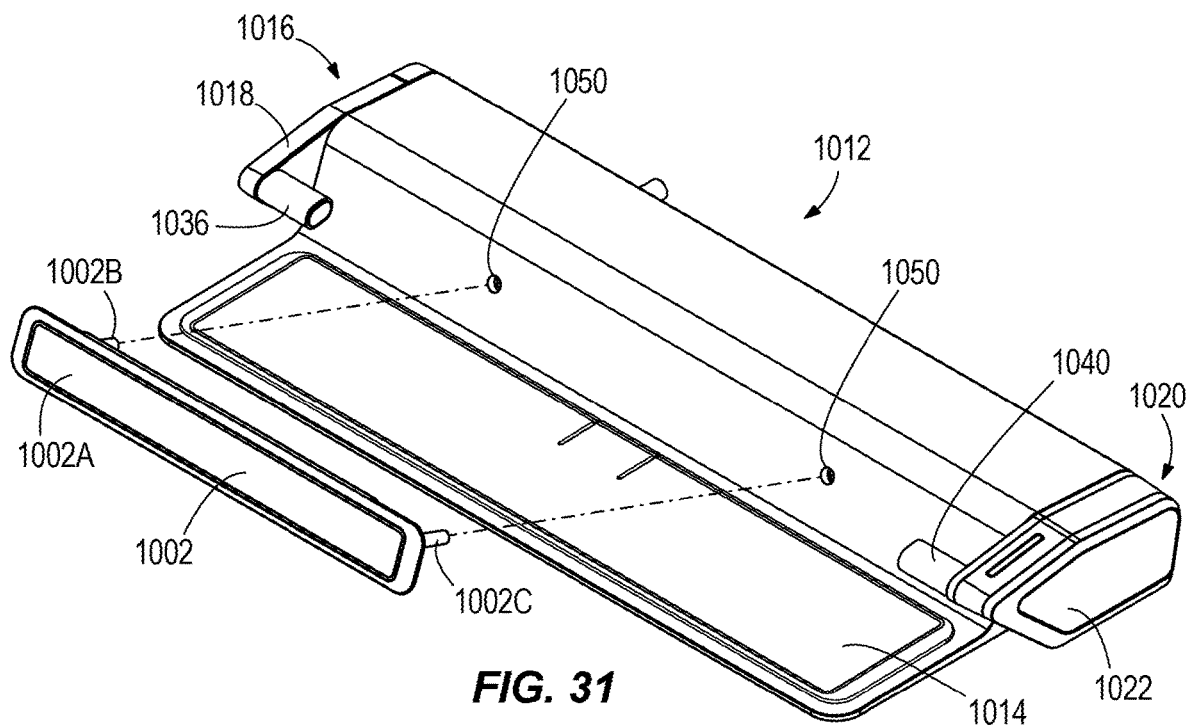
FIG. 31 is a partial exploded view of the dock of FIG. 31 showing the lock bar spaced apart from the base

The second arm 1020 is movable (e.g., translatable) within the channel 1024 to adjust the distance between the first hook 1018 and the second hook 1022. The first arm 1016 may likewise be moveable. As shown in FIGS. 30-31, the dock 1012 is provided with a lock bar 1002 that prevents translation of the arms 1016, 1020 relative to the channel 1024 when the lock bar 1002 is inserted into the channel 1024. As shown, the lock bar 1002 is a flat plate 1002A having two posts 1002B, 1002C extending therefrom. The flat plate 1002A may include or be covered by an elastomeric member that contacts a back surface of the portable electronic device to inhibit the device from scraping against the base 1014. The base 1014 includes two apertures 1050 that are spaced apart from one another at a fixed distance equal to the distance between the two posts 1002B, 1002C. The first post 1002B extends through the first aperture 1050 and engages with the body portion 1028 of the first arm 1016, and the second post 1002C extends through the second aperture 1050 and engages with the body portion 1030 of the second arm 1020 as described below with respect to FIG. 32. As such, the lock bar 1002 with the posts 1002B, 1002C is an alternative type of fastener that replaces the screws 72 shown in FIG. 5. In the illustrated embodiment, the lock bar 1002 is designed to allow removal of the lock bar 1002 from the base 1014 without tools (e.g., a screw driver, an Allen wrench, etc.).

Figure 32:
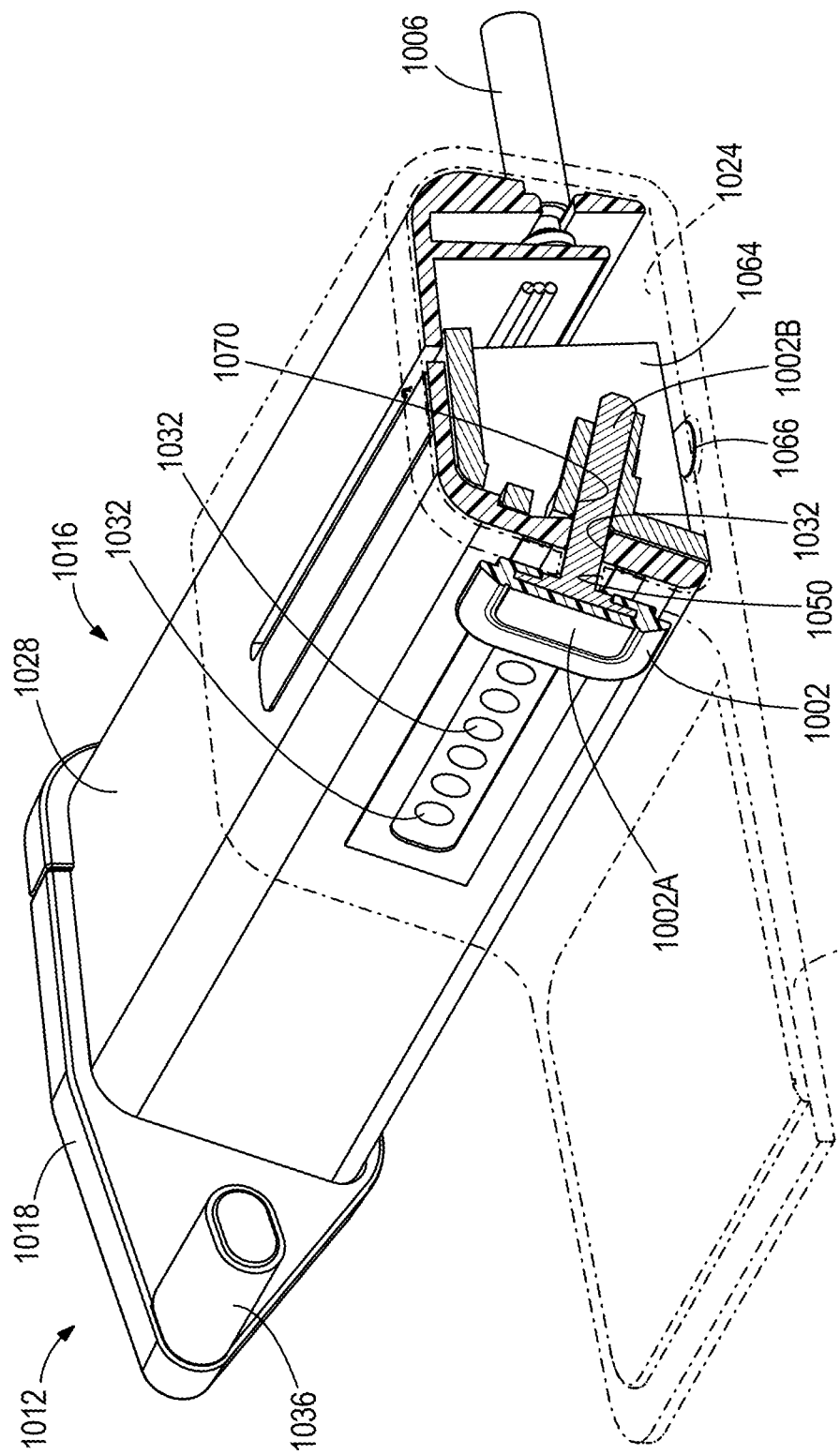
FIG. 32 is a perspective, cross-sectional view of the dock taken along section line 32-32 of FIG. 30.

FIG. 32 illustrates a cutaway through the base 1014, the lock bar 1002, the body portion 1028 of the first arm 1016, and the guide block 1064. Similar to the guide blocks 64 described with respect to FIG. 5, the guide blocks 1064 are fastened within the channel 1024 (e.g., via a fastener 1066) such that an aperture 1070 in the guide block 1064 is axially aligned with the mating aperture 1050 of the base 1050. The body portion 1028 includes a plurality of apertures 1032 (similar to the apertures 32 shown in FIG. 5) linearly aligned along a lengthwise direction of the body portion 1028.

To set a distance between the hooks 1018, 1022 to secure a portable electronic device, a user translates the first arm 1016 (and/or the second arm 1020) until the aperture 1032 in the arm 1016 (and/or the second arm 1020) is aligned with the respective apertures 1050, 1070 in the base 1014 and the guide block 1064. Selecting the appropriate aperture 1032 relies upon setting the distance between the hooks 1018, 1022 as greater than or equal to the width of the portable electronic device, and the distance between the protrusions 1036, 1040 as less than the width of the portable electronic device. Once the apertures 1050, 1032, 1070 are aligned, the user inserts the posts 1002B, 1002C through the aligned opening formed by the apertures 1050, 1032, 1070, thereby locking the first arm 1016 relative to the second arm 1020 and locking both arms 1016, 1020 relative to the base 1014 and the guide blocks 1064.

Once the lock bar 1002 is in place and the spacing of the arms 1016, 1020 is set, one or both of the hooks 1018, 1022 can be manipulated (e.g., rotated, translated, or otherwise moved/removed) as described above with respect to FIGS. 1-29 to provide access and removal of the portable electronic device from the dock 1012. When the portable electronic device is secured to the dock 1012, the device obstructs access to the lock bar 1002, thereby inhibiting translation or removal of the arms 1016, 1020 from the channel 1024.

Figure 35:
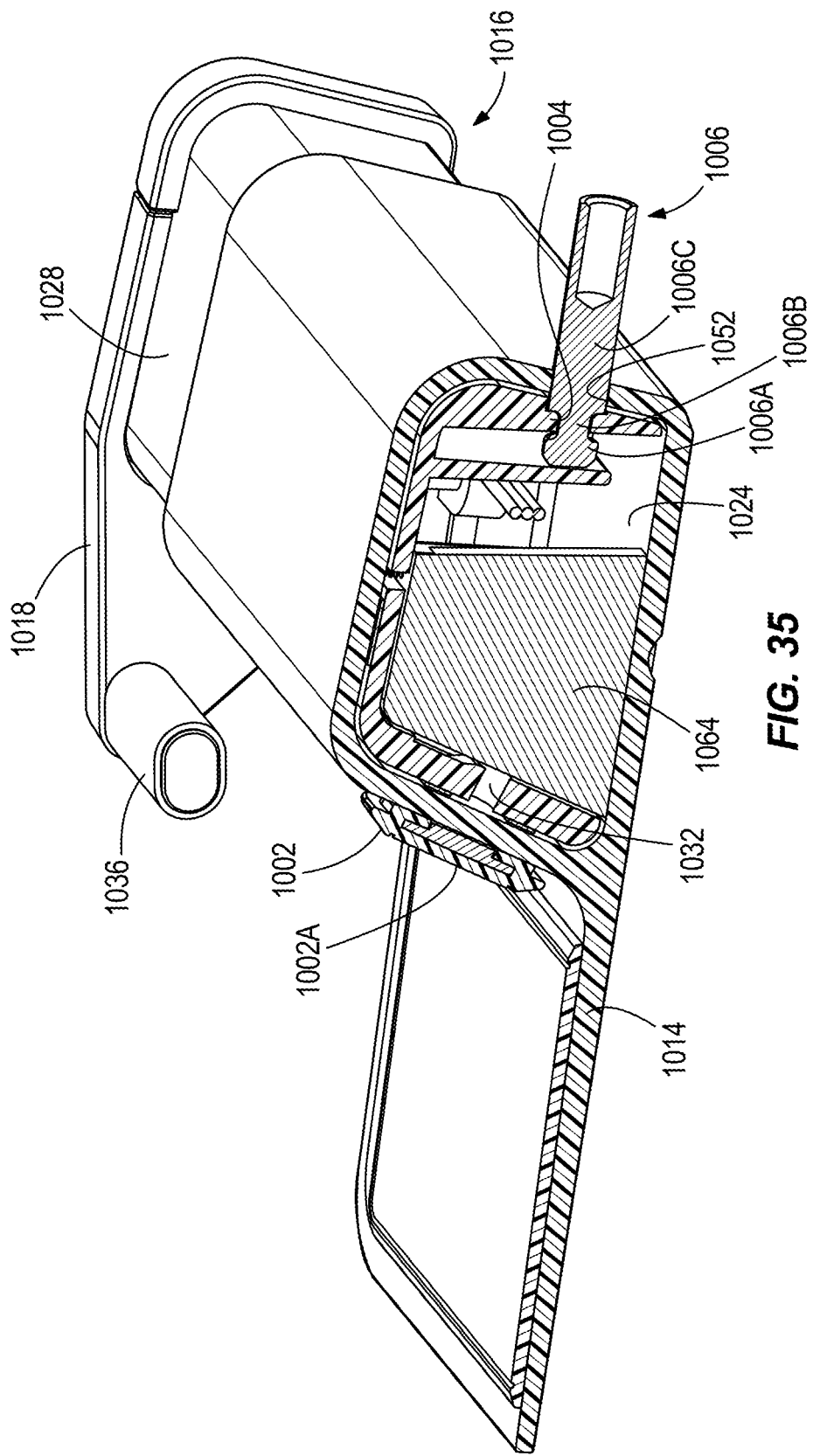
FIG. 35 is a perspective, cross-sectional view of the dock taken along section line 35-35 of FIG. 30.

FIGS. 33-35 illustrate a system for attaching the dock 1012 to an immovable object (similar to the object 60 shown in FIG. 1). Specifically, FIGS. 33-35 illustrate a locking system having a slot 1004 that is used in combination with a ferrule 1006 (FIGS. 34-35) of a lock (similar to the lock 54 shown in FIG. 1). The ferrule 1006 is a cylindrical post that is attached to a cable (similar to the flexible cable 58 shown in FIG. 1). The ferrule 1006 includes a head portion 1006A with a first diameter and a neck portion 1006B attached to and adjacent to the head portion with a second diameter less than the diameter of the head portion 1006A. The ferrule 1006 may further include a body portion 1006C attached to and adjacent to the neck portion 1006B. As shown, the body portion 1006C has a diameter similar to that of the head portion 1006A.

The rear of the base 1014 includes a circular aperture 1052 sized to accept at least the head and the neck portions 1006A, 1006B of the ferrule 1006. If the head 1006A of the ferrule is non-circular in cross-section, the aperture 1052 may otherwise be non-circular. As shown, the aperture 1052 is additionally sized to accept the body 1006C of the ferrule. The slot 1004 is formed in the body 1028 of the arm 1016 and extended in a lengthwise direction of the body 1028 (i.e., parallel to the arrows A1, A2 shown in FIGS. 33 and 34) from a first end 1004A to a second end 1004B. The first end 1004A of the slot 1004 includes an insertion/removal point for the ferrule 1006 and is therefore sized to allow the head portion to extend therethrough. The second end 1004B and the positions between the first end 1004A and the second end 1004B of the slot 1004 are lock points for the ferrule 1006 and are therefore sized to allow the neck portion to slide along the length of the slot 1004, but do not permit insertion or removal of the ferrule from the slot 1004.

The slot 1004 is formed in the body 1028 of the arm 1016 at a position, such that the apertures 1050, 1032 are misaligned when the insertion/removal point 1004A of the slot 1004 is aligned with the rear aperture 1052. Therefore, the lock bar 1002 cannot lock the position of the arm 1016 relative to the base 1014 when the ferrule 1006 is insertable or removable from the dock. Further, the slot 1004 has a length such that when any of the respective apertures 1032 (associated with the first arm 1016) are aligned with the aperture 1050, the rear aperture 1052 is likewise aligned with a lock point of the slot 1004 (i.e., a position along the slot 1004 along which the ferrule 1006 is movable, but not removable/insertable). Therefore, the ferrule 1006 is lockable within the slot 1004 at any of the positions where the aperture 1050 in the base 1014 is aligned with one of the apertures 1032 in the arm.

To facilitate locking the dock 1012 to an immovable object via the ferrule 1006, the arm 1016 is extended (FIG. 33) to an outer position by translating the hook 1018 of the arm 1016 away from the base 1014 as indicated by arrow A1. In this position, the rear aperture 1052 is aligned with the insertion/removal point 1004A of the slot 1004. The head 1006A of the ferrule 1006 is inserted through the rear aperture 1052 and through the slot 1004 such that the neck portion 1006B of the ferrule 1006 is aligned with the slot 1004. Once the ferrule 1006 is inserted, the arm 1016 is retracted (FIG. 34) to an inner position by translating the hook 1018 of the arm 1016 toward the base 1014 as indicated by arrow A2. The appropriate position of the arm 1016 (relative to the base 1014) is a position in which the portable electronic device fits between the hooks 1018, 1022 and the aperture 1050 is aligned with one of the apertures 1032 in the arm 1016, as described above with respect to the lock bar 1002. Upon alignment of the apertures 1032, 1050, the lock bar 1002 is inserted, thereby locking the position of the arm 1016 relative to the base 1014 and additionally locking the position of the ferrule 1006 relative to the slot 1004. As the ferrule 1006 is misaligned with the insertion/removal point 1004A of the slot 1004, the ferrule 1006 and associated cable are not removable and therefore lock the dock 1012 relative to the immovable object.

Various features and advantages of the invention are set forth in the following claims.

What is claimed is:

1. A dock for a portable electronic device, the portable electronic device having a first portion coupled to a second portion via a hinge, the dock comprising:
   a base having a channel and a support platform extending from the channel, the support platform configured to be positioned under and engage the first portion of the portable electronic device, a section of the base that forms the channel configured to engage the second portion of the portable electronic device;
   a first arm supported by the base, the first arm including a first hook coupled to an end of the first arm, the first hook being non-movably fixed relative to the first arm and configured to engage a first edge of the portable electronic device adjacent the hinge of the portable electronic device; and
   a second arm supported within the channel of the base and movable relative to the base and the first arm;
   a side door movably coupled to an end of the second arm for movement relative to the end of the second arm, the side door having a plate and a second hook, the plate extending from the side door and configured to be positioned within the channel, the plate having an aperture, the second hook configured to engage a second edge of the portable electronic device adjacent the hinge of the portable electronic device,
   a lock coupled to the second arm and having a locking feature;
   wherein the side door is movable between a first position, in which the locking feature engages the aperture in the plate and the portable electronic device is secured to the dock, and a second position, in which the locking feature is disengaged with the aperture in the plate and the portable electronic device is removable from the dock.

2. The dock of claim 1, wherein the lock includes an electronic lock mechanism.

3. The dock of claim 1, wherein the side door is pivotally coupled to the end of the second arm.

4. The dock of claim 3, wherein the side door remains connected to the end of the second arm while in the first position and while in the second position.

5. The dock of claim 1, wherein the side door is connected to the end of the second arm while in the first position and is disconnected from the end of the second arm while in the second position.

6. The dock of claim 1, wherein the first arm, the second arm, or both is slidably supported on the base to change a distance between the first hook and the second hook.

7. The dock of claim 6, wherein at least part of the first arm, the second arm, or both is slidably received within the channel.

8. The dock of claim 1, wherein the first arm is slidably received in a first side of the channel, and wherein the second arm is slidably received in a second side of the channel.

9. The dock of claim 8, further comprising a fastener coupled to the base and to the first arm, the second arm, or both to fix a position of the first arm, the second arm, or both relative to the base.

10. The dock of claim 9, further comprising:
    a first guide block positioned within the channel and secured to the base, wherein the first arm extends over the first guide block, and wherein the fastener engages the first guide block to fix the position of the first arm relative to the base; and a second guide block positioned within the channel and secured to the base, wherein the second arm extends over the second guide block, and wherein the fastener engages the second guide block to fix the position of the second arm relative to the base.

11. A dock for a portable electronic device, the portable electronic device having a first portion coupled to a second portion via a hinge, the dock comprising:

a base having a channel and a support platform extending from the channel, the support platform configured to be positioned under and engage the first portion of the portable electronic device, a section of the base that forms the channel having a surface that is configured to engage the second portion of the portable electronic device, a first aperture extending through the surface and a second aperture extending through the surface;

a first arm slidably received in a first side of the channel, the first arm including a first hook coupled to an end of the first arm, the first hook configured to engage a first edge of the portable electronic device;

a first fastener received by the first aperture to fix a position of the first arm relative to the base, the first fastener being inaccessible while the base supports the portable electronic device;

a second arm slidably received in a second side of the channel, the second arm including a side door movably coupled to an end of the second arm, the side door having a second hook configured to engage a second edge of the portable electronic device;

a second fastener received by the second aperture to fix a position of the second arm relative to the base, the second fastener being inaccessible while the base supports the portable electronic device; and a lock mechanism coupled to the second arm, the lock mechanism operable to selectively lock the side door to the end of the second arm thereby inhibiting unauthorized removal of the portable electronic device from the dock, and the lock mechanism operable to selectively unlock the side door from the end of the second arm in response to a keyed input.

12. The dock of claim 11, wherein the side door is pivotally coupled to the end of the second arm.

13. The dock of claim 11, wherein the second arm has a slot, and wherein the lock mechanism includes a locking head that is selectively received in the slot to inhibit movement of the side door.

14. The dock of claim 11, wherein the first arm and the second arm are slidable relative to the base to adjust a distance between the first hook and the second hook.

15. The dock of claim 11, further comprising:

a first guide block positioned within the channel and secured to the base, wherein the first arm extends over the first guide block, and wherein the first fastener engages the first guide block to fix the position of the first arm relative to the base; and a second guide block positioned within the channel and secured to the base, wherein the second arm extends over the second guide block, and wherein the second fastener engages the second guide block to fix the position of the second arm relative to the base.

16. The dock of claim 11, wherein the first fastener and the second fastener are coupled to a plate, the first fastener and the second fastener being spaced apart by a first distance, the first aperture and the second aperture being spaced apart by the first distance.

17. A dock for a portable electronic device, the portable electronic device having a first portion coupled to a second portion via a hinge, the dock comprising:

a base having a channel and a support platform extending from the channel, the support platform configured to be positioned under and engage the first portion of the portable electronic device, a section of the base that forms the channel configured to engage the second portion of the portable electronic device;

a first arm supported by the base, the first arm including a first hook coupled to an end of the first arm, the first hook being non-movably fixed relative to the first arm and configured to engage a first edge of the portable electronic device adjacent the hinge of the portable electronic device;

a second arm supported within the channel of the base and movable relative to the base and the first arm;

a side door movably coupled to an end of the second arm for movement relative to the end of the second arm, the side door having a second hook configured to engage a second edge of the portable electronic device adjacent the hinge of the portable electronic device; and an electronic lock mechanism coupled to one of the second arm and the side door, the electronic lock mechanism having an actuator and a locking feature, the actuator operable to receive a signal to selectively disengage the locking feature from the other of the second arm and the side door;

wherein the side door is movable between a first position, in which the locking feature engages the other of the second arm and the side door and the portable electronic device is secured to the dock, and a second position, in which the side door is spaced apart from second arm and the portable electronic device is removable from the dock, wherein a spring coupled to the side door biases the side door into the second position.

18. The dock of claim 17, wherein the actuator is operable to receive a wireless signal from a near-field communication (NFC) device or a Bluetooth device.

* * * * *